(12) United States Patent
Sadeghi et al.

(10) Patent No.: US 10,588,036 B2
(45) Date of Patent: Mar. 10, 2020

(54) METHOD AND APPARATUS FOR CONTROLLING UPLINK TRANSMISSION POWER BASED ON ACCUMULATED TRANSMIT POWER CONTROL COMMANDS AND CORRESPONDING UPLINK SUBFRAME SETS

(71) Applicant: InterDigital Patent Holdings, Inc., Wilmington, DE (US)

(72) Inventors: Pouriya Sadeghi, San Diego, CA (US); Janet A. Stern-Berkowitz, Little Neck, NY (US); Shahrokh Nayeb Nazar, San Diego, CA (US); J. Patrick Tooher, Montreal (CA); Moon-il Lee, Melville, NY (US); Nobuyuki Tamaki, Melville, NY (US); Ananth Kini, East Norriton, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 14/782,266

(22) PCT Filed: Apr. 1, 2014

(86) PCT No.: PCT/US2014/032521
§ 371 (c)(1),
(2) Date: Oct. 2, 2015

(87) PCT Pub. No.: WO2014/165510
PCT Pub. Date: Oct. 9, 2014

(65) Prior Publication Data
US 2016/0029239 A1 Jan. 28, 2016

Related U.S. Application Data

(60) Provisional application No. 61/882,353, filed on Sep. 25, 2013, provisional application No. 61/808,009, filed on Apr. 3, 2013.

(51) Int. Cl.
*H04B 17/345* (2015.01)
*H04B 7/08* (2006.01)
(Continued)

(52) U.S. Cl.
CPC .......... *H04W 24/10* (2013.01); *H04B 17/345* (2015.01); *H04W 52/244* (2013.01); *H04W 52/146* (2013.01)

(58) Field of Classification Search
CPC ......... H04W 36/0094; H04W 28/0236; H04W 72/0446; H04L 5/0048; H04B 7/0417
(Continued)

(56) References Cited

U.S. PATENT DOCUMENTS 5,491,837 A 2/1996 Haartsen
5,687,171 A 11/1997 Shin et al.
(Continued)

FOREIGN PATENT DOCUMENTS

CN 101404527 A 4/2009
CN 101505498 A 8/2009
(Continued)

OTHER PUBLICATIONS

Interdigital Communications, "eIMTA Configuration and Operation," 3GPP TSG-RAN WG2 #84, R2-134228, San Francisco, USA, (Nov. 11-15, 2013).
(Continued)

*Primary Examiner* — Khaled M Kassim
*Assistant Examiner* — Jason A Harley
(74) *Attorney, Agent, or Firm* — Volpe and Koenig, P.C.

(57) ABSTRACT

A method and apparatus are described for controlling uplink (UL) transmission power. A wireless transmit/receive unit (WTRU) may receive a configuration of UL subframe sets and maintain a plurality of transmit power control (TPC) command accumulator values that correspond to respective
(Continued)

ones of the UL subframe sets. The WTRU may receive a TPC command in a subframe n of a downlink (DL) transmission, determine a subframe n+k of a UL transmission that the received TPC command corresponds to, determine which of the UL subframe sets the UL transmission subframe n+k belongs to, and adjust a TPC command accumulator value that corresponds to the determined UL subframe set to determine power of the UL transmission when transmitting in the UL transmission subframe, where n is an integer, and k is an integer greater than zero.

8 Claims, 11 Drawing Sheets

(51) Int. Cl.
    *H04L 12/26*     (2006.01)
    *H04W 24/00*     (2009.01)
    *H04W 72/02*     (2009.01)
    *H04W 24/10*     (2009.01)
    *H04W 52/24*     (2009.01)
    *H04W 52/14*     (2009.01)

(58) Field of Classification Search
    USPC .......................................... 370/332; 455/332
    See application file for complete search history.

(56) References Cited

U.S. PATENT DOCUMENTS

| | | |
|---|---|---|
| 5,845,212 A | 12/1998 | Tanaka |
| 5,991,518 A | 11/1999 | Jardine et al. |
| 5,991,618 A | 11/1999 | Hall |
| 6,587,697 B2 | 7/2003 | Terry et al. |
| 6,937,584 B2 | 8/2005 | Chaponniere et al. |
| 7,054,633 B2 | 5/2006 | Seo et al. |
| 7,403,791 B2 | 7/2008 | Oki et al. |
| 7,590,095 B2 | 9/2009 | Chen et al. |
| 7,751,847 B2 | 7/2010 | Karlsson |
| 7,903,818 B2 | 3/2011 | Park et al. |
| 8,014,454 B2 | 9/2011 | Yoshii |
| 8,165,081 B2 | 4/2012 | Papasakellariou et al. |
| 8,228,855 B2 | 7/2012 | Sambhwani et al. |
| 8,315,320 B2 | 11/2012 | Zhang et al. |
| 8,335,466 B2 | 12/2012 | Cai et al. |
| 8,355,388 B2 | 1/2013 | Womack et al. |
| 8,402,334 B2 | 3/2013 | Yu et al. |
| 8,427,988 B2 | 4/2013 | Pelletier et al. |
| 8,446,856 B2 | 5/2013 | Womack et al. |
| 8,457,042 B2 | 6/2013 | Prakash et al. |
| 8,494,572 B2 | 7/2013 | Chen et al. |
| 8,509,836 B2 | 8/2013 | Shin et al. |
| 8,605,614 B2 | 12/2013 | Nishio et al. |
| 8,670,394 B2 | 3/2014 | Damnjanovic |
| 8,682,369 B2 | 3/2014 | Yang |
| 8,699,391 B2 | 4/2014 | Yeon et al. |
| 8,711,722 B2 | 4/2014 | Zhu et al. |
| 8,731,088 B2 | 5/2014 | Ko et al. |
| 8,811,249 B2 | 10/2014 | Seo et al. |
| 8,971,222 B2 | 3/2015 | Barriac |
| 9,019,903 B2 | 4/2015 | Palanki et al. |
| 9,077,496 B2 | 7/2015 | Zhou et al. |
| 9,084,201 B2 | 7/2015 | Athalye et al. |
| 9,179,350 B2 | 11/2015 | Yao et al. |
| 9,392,553 B2 | 7/2016 | Haim et al. |
| 9,451,589 B2 | 9/2016 | Nishio et al. |
| 9,629,097 B2 | 4/2017 | Ahn et al. |
| 9,655,032 B2 | 5/2017 | Takano |
| 2002/0196766 A1* | 12/2002 | Hwang ................ H04W 52/56 370/342 |
| 2003/0117980 A1* | 6/2003 | Kim ................ H04W 36/0094 370/332 |
| 2003/0232622 A1 | 12/2003 | Seo et al. |
| 2004/0223455 A1 | 11/2004 | Fong et al. |
| 2005/0085191 A1 | 4/2005 | Iacono et al. |
| 2005/0111391 A1 | 5/2005 | Oki et al. |
| 2005/0169293 A1 | 8/2005 | Zhang et al. |
| 2006/0003787 A1 | 1/2006 | Heo et al. |
| 2006/0270431 A1 | 11/2006 | Yoshi |
| 2007/0010269 A1 | 1/2007 | Azuma |
| 2007/0149146 A1 | 6/2007 | Hwang et al. |
| 2008/0039057 A1 | 2/2008 | Worrall et al. |
| 2008/0055068 A1 | 3/2008 | Van Wageningen et al. |
| 2008/0096566 A1* | 4/2008 | Brunner ................ C07D 491/04 455/437 |
| 2008/0198800 A1 | 8/2008 | Zhang et al. |
| 2009/0131027 A1 | 5/2009 | Breuer et al. |
| 2009/0175187 A1 | 7/2009 | Jersenius et al. |
| 2009/0191910 A1 | 7/2009 | Athalye et al. |
| 2009/0213805 A1 | 8/2009 | Zhang et al. |
| 2009/0227278 A1 | 9/2009 | Cho et al. |
| 2009/0239590 A1 | 9/2009 | Parkvall |
| 2009/0290538 A1 | 11/2009 | Kim et al. |
| 2010/0041428 A1 | 2/2010 | Chen et al. |
| 2010/0098012 A1 | 4/2010 | Bala et al. |
| 2010/0113004 A1 | 5/2010 | Cave et al. |
| 2010/0113057 A1 | 5/2010 | Englund et al. |
| 2010/0120446 A1 | 5/2010 | Gaal |
| 2010/0158147 A1 | 6/2010 | Zhang et al. |
| 2010/0195575 A1 | 8/2010 | Papasakellariou et al. |
| 2010/0238892 A1 | 9/2010 | Dahlman et al. |
| 2010/0246561 A1 | 9/2010 | Shin et al. |
| 2010/0255868 A1 | 10/2010 | Lee et al. |
| 2010/0296470 A1 | 11/2010 | Heo et al. |
| 2010/0297993 A1 | 11/2010 | Heo et al. |
| 2010/0317343 A1 | 12/2010 | Krishnamurthy et al. |
| 2010/0331037 A1 | 12/2010 | Jen |
| 2011/0038271 A1 | 2/2011 | Shin et al. |
| 2011/0039568 A1 | 2/2011 | Zhang et al. |
| 2011/0064159 A1 | 3/2011 | Ko et al. |
| 2011/0075675 A1 | 3/2011 | Koodle et al. |
| 2011/0105173 A1 | 5/2011 | Haim et al. |
| 2011/0111788 A1 | 5/2011 | Damnjanovic et al. |
| 2011/0134968 A1 | 6/2011 | Han et al. |
| 2011/0141928 A1 | 6/2011 | Shin et al. |
| 2011/0141938 A1 | 6/2011 | Miller et al. |
| 2011/0195735 A1 | 8/2011 | Irmer et al. |
| 2011/0207415 A1 | 8/2011 | Luo et al. |
| 2011/0280169 A1 | 11/2011 | Seo et al. |
| 2012/0034927 A1 | 2/2012 | Papasakellariou et al. |
| 2012/0093020 A1 | 4/2012 | Iwai et al. |
| 2012/0113831 A1 | 5/2012 | Pelletier et al. |
| 2012/0115520 A1 | 5/2012 | Rössel et al. |
| 2012/0134288 A1 | 5/2012 | Fang et al. |
| 2012/0201163 A1* | 8/2012 | Jongren ................ H04W 24/10 370/252 |
| 2012/0213189 A1 | 8/2012 | Choi et al. |
| 2012/0275398 A1 | 11/2012 | Chen et al. |
| 2012/0295611 A1 | 11/2012 | Amirijoo et al. |
| 2013/0010706 A1 | 1/2013 | Kela et al. |
| 2013/0028231 A1 | 1/2013 | Zhang et al. |
| 2013/0100842 A1 | 4/2013 | Nishikawa et al. |
| 2013/0114562 A1* | 5/2013 | Seo ................ H04W 52/146 370/329 |
| 2013/0170423 A1 | 7/2013 | Abe et al. |
| 2013/0194951 A1* | 8/2013 | Kim ................ H04W 72/005 370/252 |
| 2013/0208675 A1 | 8/2013 | Shen et al. |
| 2013/0235830 A1 | 9/2013 | Pelletier et al. |
| 2013/0308575 A1 | 11/2013 | Chen et al. |
| 2014/0087720 A1 | 3/2014 | Takano |
| 2014/0177601 A1 | 6/2014 | Nishio et al. |
| 2014/0293843 A1 | 10/2014 | Papasakellariou et al. |
| 2016/0029239 A1 | 1/2016 | Sadeghi et al. |

FOREIGN PATENT DOCUMENTS

| | | |
|---|---|---|
| CN | 101610102 A | 12/2009 |
| EP | 0631397 B1 | 4/2002 |
| EP | 1367739 A1 | 12/2003 |
| EP | 1605605 A2 | 12/2005 |

(56) References Cited

FOREIGN PATENT DOCUMENTS

| | | |
|---|---|---|
| EP | 1811685 A2 | 7/2007 |
| EP | 2293618 A1 | 3/2011 |
| EP | 1912345 B1 | 11/2011 |
| EP | 2536087 B1 | 10/2014 |
| EP | 1811683 B1 | 6/2017 |
| JP | 2008236675 A2 | 10/2008 |
| JP | 2008306674 A2 | 12/2008 |
| JP | 2013034113 A2 | 2/2013 |
| KR | 2009097805 A | 9/2009 |
| WO | 200161884 A1 | 8/2001 |
| WO | 2003003593 A2 | 1/2003 |
| WO | 2003043237 A1 | 5/2003 |
| WO | 2004056009 A1 | 7/2004 |
| WO | 2006095224 A1 | 9/2006 |
| WO | 2006096789 A1 | 9/2006 |
| WO | 2007050729 A1 | 5/2007 |
| WO | 2008029700 A1 | 3/2008 |
| WO | 2008042187 A2 | 4/2008 |
| WO | 2008055235 A2 | 5/2008 |
| WO | 2008101053 A2 | 8/2008 |
| WO | 2008109162 A2 | 9/2008 |
| WO | 2008115660 A1 | 9/2008 |
| WO | 2008155469 A1 | 12/2008 |
| WO | 2009099271 A1 | 8/2009 |
| WO | 2010065759 A2 | 6/2010 |
| WO | 2010077690 A1 | 7/2010 |
| WO | 2010091425 A2 | 8/2010 |
| WO | 2010107885 A2 | 9/2010 |
| WO | 2010121708 A1 | 10/2010 |
| WO | 2010135697 A2 | 11/2010 |
| WO | 2010148319 A1 | 12/2010 |
| WO | 2010148532 A1 | 12/2010 |
| WO | 2010150552 A1 | 12/2010 |
| WO | 2011041666 A2 | 4/2011 |
| WO | 2011055943 A2 | 5/2011 |
| WO | 2012008773 A2 | 1/2012 |
| WO | 2012094933 A1 | 7/2012 |
| WO | 2013021531 A1 | 2/2013 |
| WO | 2013/049769 A1 | 4/2013 |

OTHER PUBLICATIONS

Interdigital, "On remaining details for UL power control with eIMTA," 3GPP TSG-RAN WG1 Meeting #75, R1-135598, San Francisco, USA, (Nov. 11-15, 2013).

Interdigital, "On remaining details for UL power control with eIMTA," 3GPP TSG-RAN WG1 Meeting #74bis, R1-134556, Guangzhou, China (Oct. 7-11, 2013).

Interdigital, "Tx Power Control for eIMTA," 3GPP TSG-RAN WG1 Meeting #72bis, R1-131340, Chicago, USA (Apr. 15-19, 2013).

Qualcomm Incorporated, "Interference mitigation schemes," 3GPP TSG RAN WG1 Meeting #72, R1-130586, St. Julian's, Malta (Jan. 28-Feb. 1, 2013).

Samsung, "Power control in flexible subframes for eIMTA," 3GPP TSG RAN WG1 #72, R1-130290, St. Julian's, Malta (Jan. 28-Feb. 1, 2013).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.2.0 (Feb. 2013).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).

Third Generation Partnership Project, "Technical Specification Group Radio Access Network; Evolved Universal Terrestrial Radio Access (E-UTRA); Physical channels and modulation (Release 12)," 3GPP TS 36.211 V12.1.0 (Mar. 2014).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).

Third Generation Partnership Project, "Technical Specification Group Radio Access Network; Evolved Universal Terrestrial Radio Access (E-UTRA); Multiplexing and channel coding (Release 11)," 3GPP TS 36.212 V11.2.0 (Feb. 2013).

Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.9.0 (Feb. 2013).

Third Generation Partnership Project, "Technical Specification Group Radio Access Network; Evolved Universal Terrestrial Radio Access (E-UTRA); Physical layer procedures (Release 10)," 3GPP TS 36.213 V10.12.0 (Mar. 2014).

Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).

Third Generation Partnership Project, "Technical Specification Group Radio Access Network; Evolved Universal Terrestrial Radio Access (E-UTRA); Physical layer procedures (Release 11)," 3GPP TS 36.213 V11.6.0 (Mar. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.1.0 (Mar. 2014).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.7.0 (Mar. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.1.0 (Mar. 2014).
LG Electronics, Inc., "Use of Configured ABS Pattern after HO failure and RLF," 3GPP TSG-RAN WG2 #72bis, R2-110460, Dublin, Ireland (Jan. 17-21, 2011).
Ericsson, "CFN/SFN in measurement reporting," R3-002537, TSG-RAN Working Group 3 Meeting #16, Windsor, UK (Oct. 16-20, 2000).
Ericsson et al, "Standardization Impact of CoMP," 3GPP TSG-RAN WG1 #66, R1-112094, Athens, Greece (Aug. 22-26, 2011).
Ericsson, "On remaining details for uplink power control with carrier aggregation," 3GPP TSG RAN WG1 Meeting #60, R1-100846, San Francisco, USA (Feb. 22-26, 2010).
ETRI, "Uplink power control for CoMP Scenarios 3 and 4," 3GPP TSG RAN WG1 Meeting #66, R1-112212, Athens, Greece (Aug. 22-26, 2011).
Samsung, "PUCCH/PUSCH power headroom reporting," 3GPP TSG-RAN WG1#60bis, R1-102179, Beijing, China (Apr. 12-16, 2010).
Sharp, "Considerations on power headroom reporting in LTE-A," 3GPP TSG-RAN WG1#60bis, R1-102397, Beijing, China (Apr. 12-16, 2010).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.3.0 (Sep. 2008).
Third Generation Partnership Project, "Technical Specification Group Radio Access Network; Evolved Universal Terrestrial Radio Access (E-UTRA); Physical layer procedures (Release 8)," 3GPP TS 36.213 V8.4.0 (Sep. 2008).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.3.0 (Sep. 2011).
Third Generation Partnership Project, "Technical Specification Group Radio Access Network; Evolved Universal Terrestrial Radio Access (E-UTRA); Physical layer procedures (Release 10)," 3GPP TS 36.213 V10.0.0 (Dec. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.2.0 (Jun. 2011).
Third Generation Partnership Project, "Technical Specification Group Radio Access Network; Evolved Universal Terrestrial Radio Access (E-UTRA); Physical layer procedures (Release 8)," 3GPP TS 36.213 V8.7.0 (May 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.2.0 (Jun. 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Further Advancements for E-UTRA Physical Layer Aspects (Release 9)," 3GPP TR 36.814 V0.4.1 (Feb. 2009).
Third Generation Partnership Project, "Technical Specification Group Radio Access Network; Further Advancements for E-UTRA Physical Layer Aspects (Release 9)," 3GPP TR 36.814 V1.5.0 (Nov. 2009).
Third Generation Partnership Project, "Technical Specification Group Radio Access Network; Coordinated multi-point operation for LTE physical layer aspects (Release 11)," 3GPP TR 36.819 V1.2.0 (Sep. 2011).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.1.0 (Sep. 2009).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.10.0 (Jun. 2010).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.4.0 (Jun. 2010).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.7.0 (Sep. 2009).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.4.0 (Dec. 2008).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.7.0 (Sep. 2009).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.0.0 (Sep. 2009).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).

(56) References Cited

OTHER PUBLICATIONS

Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.0.0 (Sep. 2009).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.7.0 (Sep. 2009).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.10.0 (Jun. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.1.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).
Third Generation Partnership Project, "Technical Specification Group Radio Access Network; User Equipment (UE) radio transmission and reception (FDD) (Release 8)," 3GPP TS 25.101 V8.5.1 (Jan. 2009).
Third Generation Partnership Project, "Technical Specification Group Radio Access Network; User Equipment (UE) radio transmission and reception (FDD) (Release 9)," 3GPP TS 25.101 V9.2.0 (Dec. 2009).
Third Generation Partnership Project, "Technical Specification Group Radio Access Network; User Equipment (UE) radio transmission and reception (FDD) (Release 8)," 3GPP TS 25.101 V8.9.0 (Dec. 2009).
ZTE, "Power Headroom Reporting for Carrier Aggregation in LTE-Advanced," 3GPP TSG RAN WG1 Meeting #60bis, R1-101814, Beijing, China (Apr. 12-16, 2010).
3GPP™ Work Item Description, "Coordinated Multi-Point Operation for LTE—Downlink Core Part," CoMP UL Performance, RP-11365, Fukuoka, Japan (Sep. 13-16, 2011).
3GPP™ Work Item Description, "Coordinated Multi-Point Operation for LTE—Downlink Core Part," CoMP Feature, RP-11365, Fukuoka, Japan (Sep. 13-16, 2011).
3GPP™ Work Item Description, "Coordinated Multi-Point Operation for LTE—Downlink Core Part," CoMP UL Core, RP-11365, Fukuoka, Japan (Sep. 13-16, 2011).
3GPP™ Work Item Description, "Coordinated Multi-Point Operation for LTE—Downlink Core Part," DL Core, RP-11365, Fukuoka, Japan (Sep. 13-16, 2011).
3GPP™ Work Item Description, "Coordinated Multi-Point Operation for LTE—Downlink Core Part," DL Performance, RP-11365, Fukuoka, Japan (Sep. 13-16, 2011).
Asustek et al., "Clarification on RNTI for TPC command." 3GPP TSG-RAN WG1 Meeting #57, R1-092265, San Francisco, USA (May 4-8, 2009).
Catt, "Considerations on uplink power control in LTE-Advanced," 3GPP TSG RAN WG1 meeting #59bis, R1-100071, Valencia, Spain (Jan. 18-22, 2010).
Catt, "Considering about PHR," 3GPP TSG RAN WG2 #63bis, R2-085326, Prague, Czech Republic (Sep. 29-Oct. 3, 2008).
Catt, "Impact of CA on MAC layer," 3GPP TSG RAN WG2 meeting #66bis, R2-093723, Los Angeles, USA, (Jun. 29-Jul. 3, 2009).

Ericsson et al., "Potential Enhancements for SRS in Rel-11," 3GPP TSG RAN WG1 Meeting #66, R1-112085, Athens, Greece (Aug. 22-26, 2011).
Ericsson et al., "Standardization Support for UL CoMP," 3GPP TSG RAN WG1 Meeting #66, R1-112426, Athens, Greece (Aug. 22-26, 2011).
Ericsson et al., "Uplink Power Control for Carrier Aggregation," 3GPP TSG RAN WG1 Meeting #58bis, R1-094274, Miyazaki, Japan (Oct. 12-16, 2009).
Ericsson, "Carrier aggregation in LTE-Advanced," TSG-RAN WG1 #53bis, R1-082468, Warsaw, Poland (Jun. 30-Jul. 4, 2008).
Ericsson, "Summary of e-mail discussion [70#15] LTE CA: PHR Handling," 3GPP TSG-RAN WG2 #70bis, R2-103580, Stockholm, Sweden (Jun. 28-Jul. 2, 2018).
Ericsson, "Text proposal for TR36.814 on uplink transmission scheme," TSG-RAN WG1 Meeting #55bis, R1-090544, Ljubljana, Slovenia (Jan. 12-16, 2009).
Huawei, "UL Power Control in Carrier Aggregation," 3GPP TSG RAN WG1 Meeting #58bis, R1-093840, Miyazaki, Japan (Oct. 12-16, 2009).
Interdigital Communciations, LLC, "CM Analysis of UL Transmission for LTE-A," 3GPP TSG-RAN WG1 Meeting #54, R1-082807, Jeju, Korea (Aug. 18-22, 2008).
Interdigital Communications LLC, "Proposed Way Forward on UL Power Control for LTE—A Bandwidth Extension," 3GPP TSG-RAN WG1 Meeting #58, R1-093070, Shenzhen, China (Aug. 24-28, 2009).
LG Electronics et al., "Alignment of RAN1/RAN4 specification on UE maximum output power," 3GPP TSG RAN WG1 #55bis, R1-090430, Ljubljana, Slovenia (Jan. 12-16, 2009).
LG Electronics, "PUCCH piggybacking onto PUSCH in case of transmit power limitation," 3GPP TSG RAN WG1 #56, R1-090654, Athens, Greece (Feb. 9-13, 2009).
LG Electronics, "Uplink multiple channel transmission in case of UE transmit power limitation," 3GPP TSG RAN WG1 #56, R1-090655, Athens, Greece (Feb. 9-13, 2009).
LG Electronics, "Uplink power control in LTE-Advanced," 3GPP TSG RAN WG1 #59, R1-094470, Jeju, Korea (Nov. 9-13, 2009).
MCC Support, "Final Report of 3GPP TSG RAN WG1 #60bis v1.0.0 (Beijing, China, Apr. 12-16, 2010)," 3GPP TSG RAN WG1 Meeting #61, R1-102601, Montreal, Canada, (May 10-14, 2010).
MCC Support, "Final Report of 3GPP TSG RAN WG1 #61 v3.0.0 (Montreal, Canada, May 10-14, 2010)," 3GPP TSG RAN WG1 Meeting #61bis, R1-104183, Dresden, Germany (Jun. 28-Jul. 2, 2010).
Mediatek Inc., "Further Discussion on HeNB Downlink Power Setting in HetNet," 3GPP TSG-RAN WG1 #62bis, R1-105238, Xi'an, China (Oct. 11-15, 2010).
Motorola, "Introduction of Rel-10 LTE-Advanced features in 36.213," 3GPP TSG-RAN Meeting #62, R1-105098, Madrid, Spain (Aug. 23-27, 2010).
Motorola, "To Fix the Discrepancy of Uplink Power Control and Channel Coding of Control Information in PUSCH," 3GPP TSG-RAN1 Meeting #55, R1-084702, Prague, Czech Republic (Nov. 10-14, 2008).
Nokia Siemens Networks et al., "PUSCH Power Control for LTE-Advanced," 3GPP TSG RAN WG1 #56 Meeting, R1-090738, Athens, Greece (Feb. 9-13, 2009).
Nokia Siemens Networks et al., "PUSCH Power Control for LTE-Advanced," 3GPP TSG RAN WG1 #57 Meeting, R1-091780, San Francisco, USA (May 4-8, 2009).
Nokia Siemens Networks et al., "PUSCH Power Control for LTE-Advanced," 3GPP TSG RAN WG1 #57bis Meeting, R1-092574, Los Angeles, USA (Jun. 29-Jul. 3, 2009).
Nokia Siemens Networks et al., "Triggers for Power Headroom Reports in EUTRAN Uplink," 3GPP TSG RAN WG1 Meeting #52bis, R1-081464, Shenzhen, China (Mar. 31-Apr. 4, 2008).
Nokia Siemens Networks et al., "UL control signalling to support bandwidth extension in LTE-Advanced," 3GPP TSG RAN WG1 Meeting #55bis, R1-090234, Ljubljana, Slovenia (Jan. 12-16, 2009).
Nokia Siemens Networks et al., "Uplink DN RS performance evaluation from CoMP viewpoint," 3GPP TSG RAN WG1 Meeting #58, R1-093307, Shenzhen, China (Aug. 24-28, 2009).

(56) References Cited

OTHER PUBLICATIONS

Qualcomm Europe, "[Draft] LS on Power Amplifier configurations for UEs with multiple transmit antennas in LTE-A," 3GPP TSG-WG1 #57bis, R1-092983, Los Angeles, USA (Jun. 29-Jul. 3, 2009).
Qualcomm Europe, "Aspects to consider for DL transmission schemes of LTE-A," 3GPP TSG-RAN WG1 #55, R1-084398, Prague, Czech Republic (Nov. 10-14, 2008).
Qualcomm Europe, "CM Analysis of Concurrent PUSCH and PUCCH UL transmission for LTE-A," 3GPP TSG RAN WG1 #55bis, R1-090363, Ljubljana, Slovenia (Jan. 12-16, 2009).
Qualcomm Europe, "Support of Concurrent Transmission of PUCCH and PUSCH in LTE-A Uplink," 3GPP TSG RAN WG1 #55bis, R1-090362, Ljubljana, Slovenia (Jan. 12-16, 2009).
RAN4, "LS reply on uplink power control in LTE-A," 3GPP TSG-RAN WG1 Meeting #60bis, R1-101715, Beijing, China, (Apr. 12-16, 2010).
Research in Motion et al., "Uplink Power Control for Carrier Aggregation," 3GPP TSG RAN WG1 Meeting #57b, R1-092415, Los Angeles, USA (Jun. 29-Jul. 3, 2009).
Research in Motion UK Limited, "Uplink Power Control for Carrier Aggregation," 3GPP TSG RAN WG1 Meeting #58, R1-093297, Shenzhen, China (Aug. 24-28, 2009).
Research in Motion, UK Limited, "PRACH Enhancement and UL Power Control for CoMP Scenario 4," 3GPP TSG RAN WG1 Meeting #66, R1-112372, Athens, Greece (Aug. 22-26, 2011).
Samsung, "Concurrent PUSCH and PUCCH Transmissions," 3GPP TSG RAN WG1 #56, R1-090611, Athens, Greece (Feb. 9-13, 2009).
Samsung, "Concurrent PUSCH and PUCCH Transmissions," 3GPP TSG RAN WG1 #56bis, R1-091248, Seoul, Korea (Mar. 23-27, 2009).
Samsung, "Concurrent PUSCH and PUCCH Transmissions," 3GPP TSG RAN WG1 #57bis, R1-092669, Los Angeles, USA (Jun. 29-Jul. 3, 2009).
Samsung, "UL Transmission Power Control in LTE-A," 3GPP TSG RAN WG1 #57bis, R1-092670, Los Angeles, USA (Jun. 29-Jul. 3, 2009).
Shen Jia et al., "3GPP Long Term Evolution: Principle and System Design," section 3.4.2, Posts and Telecom Press, pp. 111-114 (Nov. 2008).
Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.5.0 (Mar. 2014).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.1.0 (Mar. 2014).
Third Generation Partnership Project, "Technical Specification Group Radio Access Network; Coordinated multi-point operation for LTE physical layer aspects (Release 11)," 3GPP TR 36.819 V11.1.0 (Dec. 2011).
Third Generation Partnership Project, "Technical Specification Group Radio Access Network; Coordinated multi-point operation for LTE physical layer aspects (Release 11)," 3GPP TR 36.819 V11.2.0 (Sep. 2013).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.4.0 (Mar. 2013).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.8.0 (Mar. 2014).
Third Generation Partnership Project, "Technical Specification Group Radio Access Network; Evolved Universal Terrestrial Radio Access (E-UTRA); Requirements for support of radio resource management (Release 12)," 3GPP TS 36.133 V12.3.0 (Mar. 2014).
Third Generation Partnership Project, "Technical Specification Group Radio Access Network; User Equipment (UE) radio transmission and reception (FDD) (Release 11)," 3GPP TS 25.101 V11.5.0 (Mar. 2013).
Third Generation Partnership Project, "Technical Specification Group Radio Access Network; User Equipment (UE) radio transmission and reception (FDD) (Release 11)," 3GPP TS 25.101 V11.9.0 (Mar. 2014).
Third Generation Partnership Project, "Technical Specification Group Radio Access Network; User Equipment (UE) radio transmission and reception (FDD) (Release 12)," 3GPP TS 25.101 V12.3.0 (Mar. 2014).
ZTE, "Considerations on scheduling in carrier aggregation," 3GPP TSG RAN WG2 meeting #66bis, R2-093886, Los Angeles, USA, (Jun. 29-Jul. 3, 2009).
Fujitsu, "Zero-Power CSI-RS Configurations for Interference Measurements in CoMP," 3GPP TSG-RAN WG1 #69, R1-122078, Prague, Czech Republic (May 21-25, 2012).

* cited by examiner

| SPECIAL SUBFRAME CONFIGURATION | NORMAL CYCLIC PREFIX IN DOWNLINK | | | EXTENDED CYCLIC PREFIX IN DOWNLINK | | |
|---|---|---|---|---|---|---|
| | DwPTS | GP | UpPTS NORMAL CYCLIC PREFIX IN UPLINK | DwPTS | GP | UpPTS EXTENDED CYCLIC PREFIX IN UPLINK |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | 5 | 5 | 2 |
| 8 | 11 | 1 | 2 | — | — | — |
| 9 | 6 | 6 | 2 | — | — | — |

FIG. 3

| UL-DL CONFIGURATION | DL-UL SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

| TDD UL/DL CONFIGURATION | SUBFRAME NUMBER n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | 4 | 4 | |
| 5 | | | | | | | | | 4 | |
| 6 | 7 | 7 | | | | 7 | 7 | | | 5 |

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG. 8

| TDD UL/DL CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

METHOD AND APPARATUS FOR
CONTROLLING UPLINK TRANSMISSION
POWER BASED ON ACCUMULATED
TRANSMIT POWER CONTROL COMMANDS
AND CORRESPONDING UPLINK
SUBFRAME SETS

CROSS REFERENCE TO RELATED
APPLICATIONS

This application is a 371 of International PCT/US2014/032521 filed Apr. 1, 2014, which claims the benefit of U.S. Provisional Application Ser. No. 61/808,009 filed Apr. 3, 2013, and U.S. Provisional Application Ser. No. 61/882,353 filed Sep. 25, 2013, the contents of which are incorporated herein by reference in their entirety.

BACKGROUND

In a traditional time division duplex (TDD) system, all cells may have the same TDD uplink (UL)/downlink (DL) configurations, and therefore the transmission directions (i.e., UL or DL) in all subframes for all neighbor cells may be the same. However, in some scenarios, the neighboring cells may not have the same TDD UL/DL configurations, (e.g., in TDD systems with cells capable of dynamically changing their TDD UL/DL configuration).

Consequently, in such systems, subframes may exist that may be DL subframes for one cell, and UL subframes for another cell, or vice versa. One immediate consequence of such an arrangement may be that the UL transmission of the some cells may interfere with the DL transmission of other cells, or vice versa. Such a new interference environment, which does not exist for frequency division duplex (FDD) and legacy TDD systems, may considerably impact the operation and the quality of UL and/or DL transmission. As a result, solutions are required to improve the performance of the TDD system in such an interference environment.

SUMMARY

A method and apparatus are described for controlling uplink (UL) transmission power. A wireless transmit/receive unit (WTRU) may receive a configuration of UL subframe sets and maintain a plurality of transmit power control (TPC) command accumulator values that correspond to respective ones of the UL subframe sets. The WTRU may receive a TPC command in a subframe n of a downlink (DL) transmission, determine a subframe n+k of a UL transmission that the received TPC command corresponds to, determine which of the UL subframe sets the UL transmission subframe n+k belongs to, and adjust a TPC command accumulator value that corresponds to the determined UL subframe set to determine power of the UL transmission when transmitting in the UL transmission subframe, where n is an integer, and k is an integer greater than zero.

BRIEF DESCRIPTION OF THE DRAWINGS

A more detailed understanding may be had from the following description, given by way of example in conjunction with the accompanying drawings wherein:

FIG. 3 shows examples of time division duplex (TDD) uplink (UL)/downlink (DL) subframe configurations for normal and extended cyclic prefixes (CPs);

FIG. 5 shows examples of UL/DL switching point periodicity of the special subframe configurations of FIG. 3;

FIG. 6 shows an example of UL scheduling timing for various TDD configurations;

FIG. 7 shows examples of a DL association set index for TDD DL hybrid automatic repeat request (HARQ);

FIG. 8 shows examples of TDD UL/DL configurations of a physical HARQ indicator channel (PHICH);

DETAILED DESCRIPTION

Figure 1A:
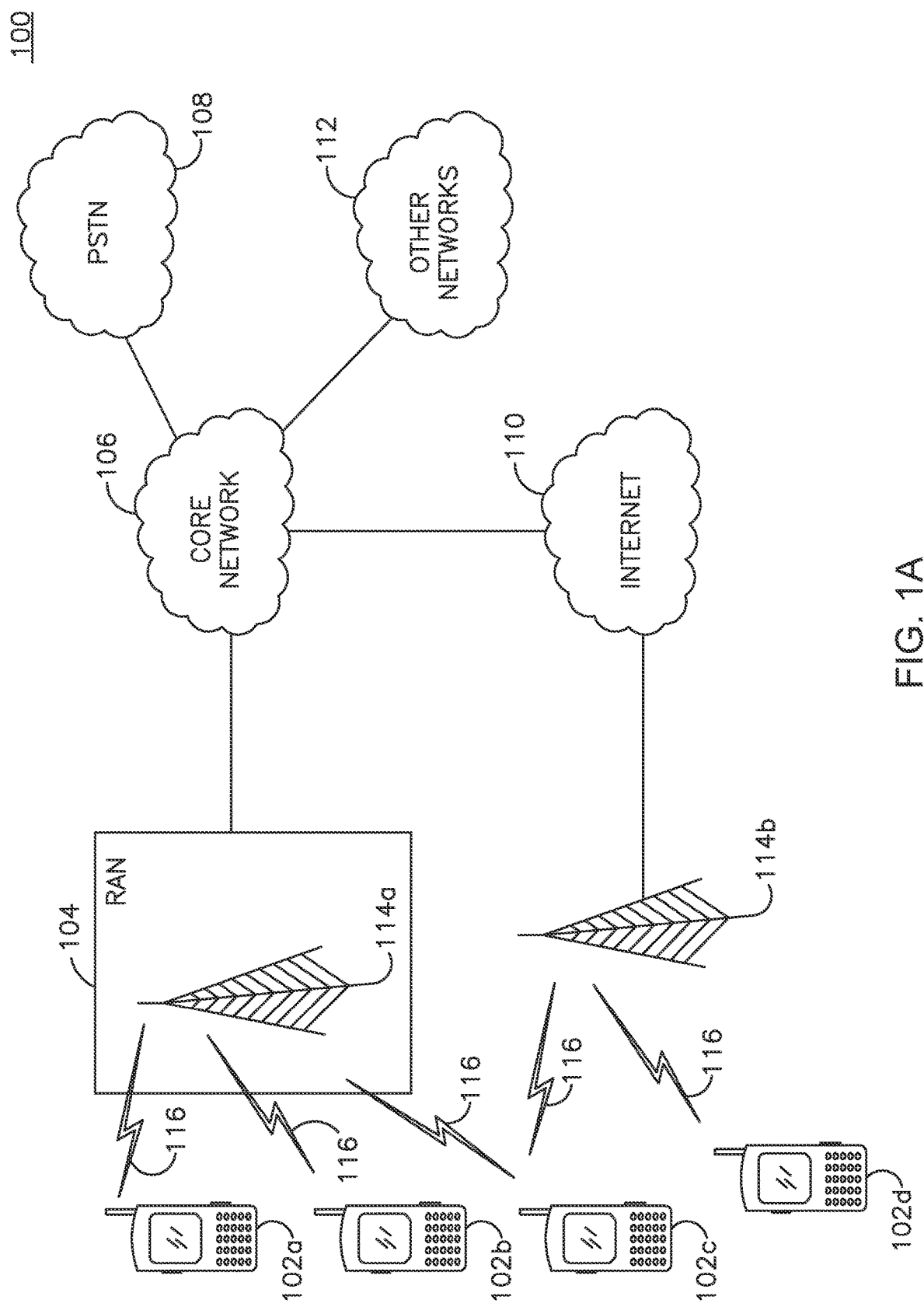
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
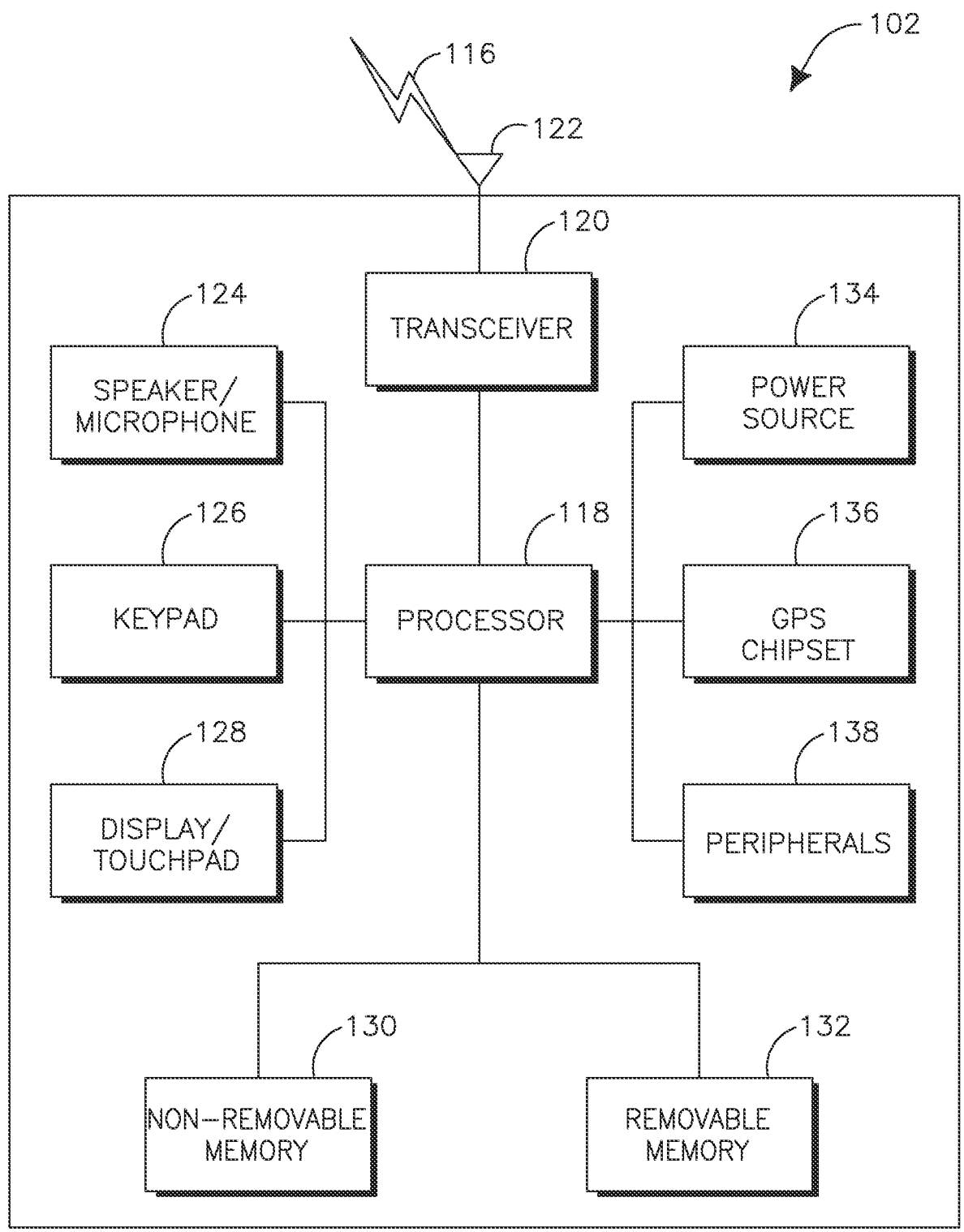
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
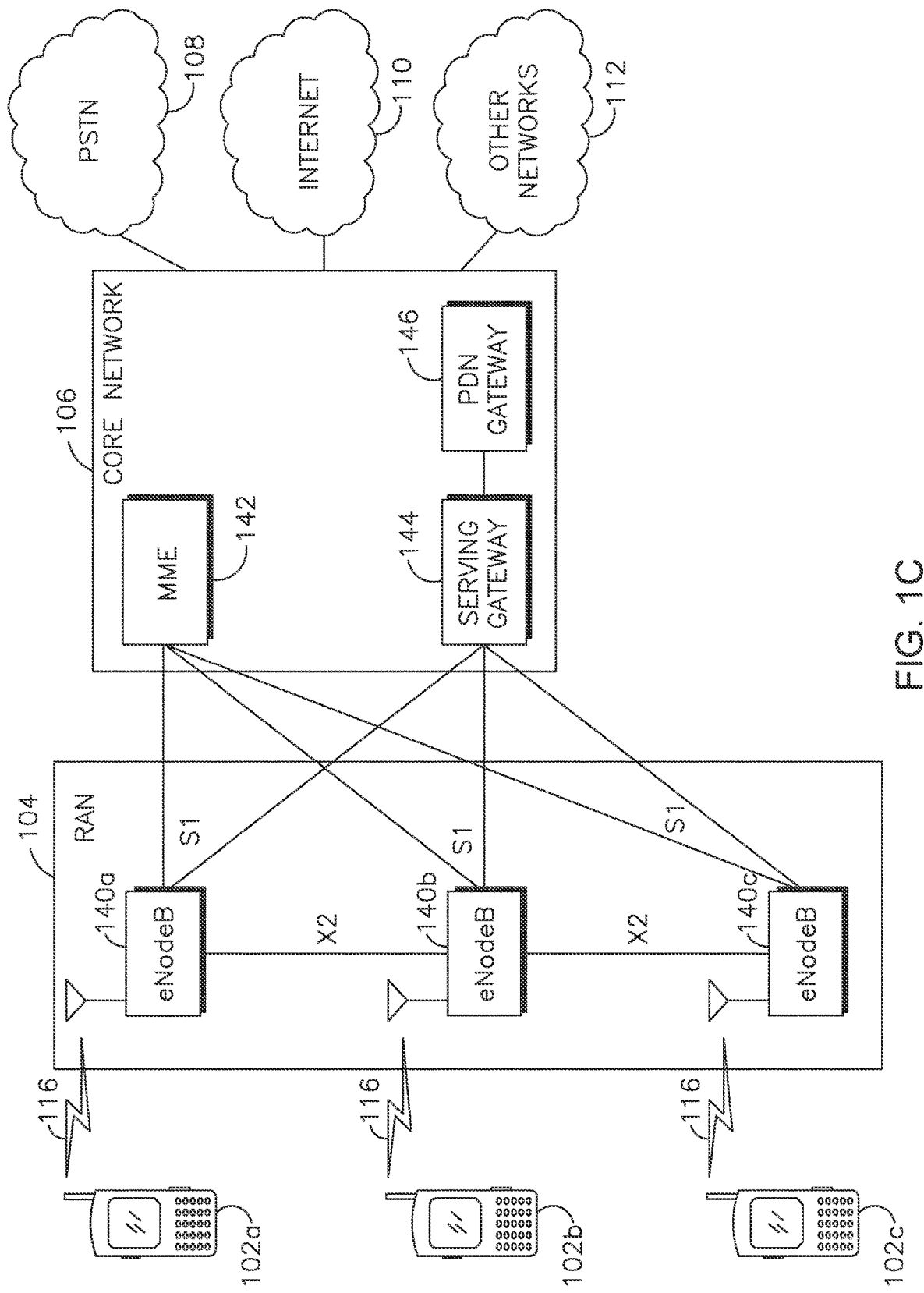
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

LTE is a standard for wireless communication of high-speed data for mobile phones and data terminals. LTE is based on the global system for mobile communications (GSM)/enhanced data rates for GSM evolution (EDGE) and universal mobile telecommunications system (UMTS)/high speed packet access (HSPA) network technologies, increasing the capacity and speed using a different radio interface together with core network improvements.

For single carrier LTE there may be up to 100 Mbps in the downlink (DL), and 50 Mbps in the uplink (UL) for a 2×2 configuration. The LTE DL transmission scheme is based on an orthogonal frequency division multiple access (OFDMA) air interface.

For the purpose of flexible deployment, there may be support for scalable transmission bandwidths, which may be one of 1.4, 2.5, 5, 10, 15 or 20 MHz. Each radio frame (10 ms) may include 10 of 1 ms each. Each sub-frame may include 2 time slots of 0.5 ms each. There may be either 7 or 6 OFDM symbols per timeslot. Seven symbols per timeslot may be used with normal cyclic prefix length, and 6 symbols per timeslot may be used with the extended cyclic prefix length. The sub-carrier spacing may be 15 kHz. A reduced sub-carrier spacing mode using 7.5 kHz is also possible.

A resource element (RE) corresponds to one sub-carrier during one OFDM symbol interval. Twelve consecutive sub-carriers during a 0.5 ms timeslot constitute one resource block (RB). Therefore, with 7 symbols per timeslot, each RB consists of 12×7=84 REs. A DL carrier may include 6-110 RBs corresponding to an overall scalable transmission bandwidth of roughly 1 MHz to 20 MHz. Each transmission bandwidth, (e.g., 1.4, 3, 5, 10 or 20 MHz), may correspond to a number of RBs.

The basic time-domain unit for dynamic scheduling is one sub-frame including two consecutive timeslots, which may be referred to as a resource-block pair. Certain sub-carriers on some OFDM symbols may be allocated to carry pilot signals in the time-frequency grid. A number of sub-carriers at the edges of the transmission bandwidth may not be transmitted in order to comply with spectral mask requirements.

In single carrier configuration where the network (NW) assigns the WTRU only one pair of UL and DL carriers (for frequency division duplex (FDD)) or one carrier time shared for UL and DL (for time division duplex (TDD)), for any given subframe there may be a single hybrid automatic repeat request (HARQ) process active for the UL, and a single HARQ process active in the DL.

LTE-A with carrier aggregation (CA) may improve single carrier LTE data rates using, among other solutions, bandwidth extensions referred to as CA. With CA, the WTRU may transmit and receive simultaneously over a physical uplink shared channel (PUSCH) and a physical downlink shared channel (PDSCH) of multiple serving cells; up to four secondary serving cells (SCells) may be used in addition to a primary serving cell (PCell), thus supporting flexible bandwidth assignments up to 100 MHz. UL control information (UCI) may include HARQ positive acknowledgement (ACK)/negative acknowledgement (NACK) feedback and/or channel state information (CSI), and may be transmitted either on physical UL control channel (PUCCH) resources of the PCell or on PUSCH resources available for a serving cell configured for UL transmissions.

The control information for the scheduling of PDSCH and PUSCH may be sent on at least one physical data control channel (PDCCH). In addition to using one PDCCH for a pair of UL and DL carriers, cross-carrier scheduling may be supported for a given PDCCH, allowing the network to provide PDSCH assignments and/or PUSCH grants for transmissions in other serving cell(s).

For a WTRU operating with CA, there may be one HARQ entity for each serving cell, each entity having 8 HARQ processes. That is, one per subframe for one round-trip time (RTT). More than one HARQ process may be active for the UL and for the DL in any given subframe, but at most one UL and one DL HARQ process per configured serving cell.

Figure 2:
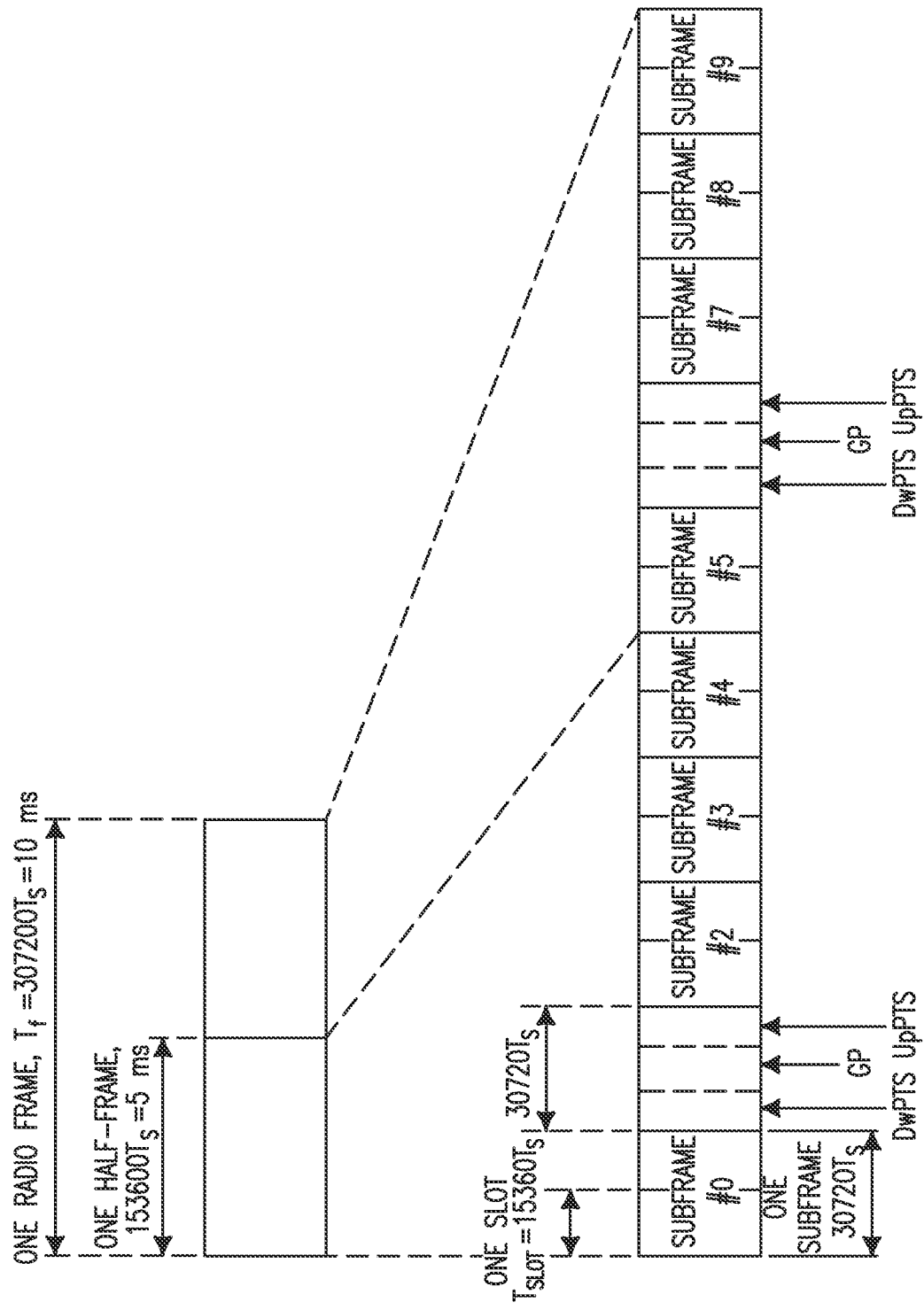
FIG. 2 shows an example of a frame structure type 2 for 5 ms switch-point periodicity.

FIG. 2 shows an example of a frame structure type 2 for 5 ms switch-point periodicity. In the FDD mode of operation, different carriers may be used for UL and DL transmissions and a full duplex WTRU may simultaneously receive in the DL and transmit in the UL. In the TDD mode of operation, UL and DL transmissions may be performed on the same carrier frequency and may be separated in time. For a given carrier, a WTRU may not simultaneously receive in the DL and transmit in the UL. A 10 ms TDD frame may consist of 10 subframes of 1 ms each, as shown in FIG. 2. Based on the TDD UL/DL configuration, the subframes may be divided between UL and DL.

FIG. 3 shows examples of TDD UL/DL subframe configurations for normal and extended cyclic prefixes (CPs). FIG. 3 provides some possible special subframe configurations, assuming the same CP used in both DL and UL. The special subframe configurations may include a DL pilot timeslot (DwPTS), a guard period (GP), and a UL pilot timeslot (UpPTS).

Figure 4:
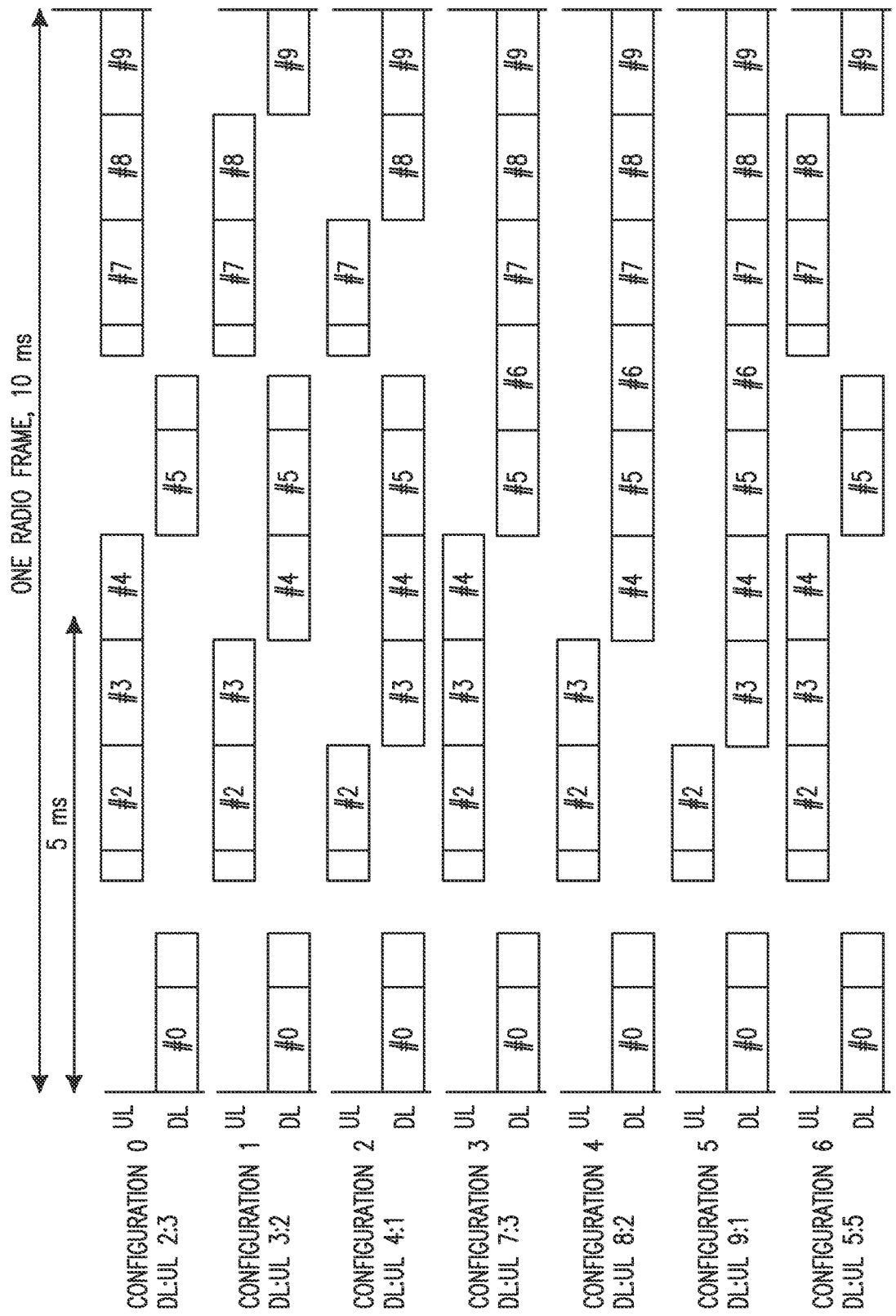
FIG. 4 shows examples of TDD UL/DL configurations with subframe arrangements.

As shown in FIG. 3, in the normal CP case, the GP can be 1, 2, 3, 4, 6, 9 and 10 OFDM symbols long. In the extended CP case, the GP can be 1, 2, 3, 5, 7 and 8 OFDM symbols long. A special subframe may have at least one OFDM symbol for UpPTS. DwPTS may be treated as a normal but shortened DL subframe, which may carry DL control signals, (e.g., PDCCH, physical control format indicator channel (PCFICH), PHICH), and possibly DL data. In TDD operation, a WTRU requires enough guard time when changing from UL transmission to DL reception and vice versa. The special frame UL part may carry sounding reference signal (SRS) or random access requests. As used herein, special subframes may be treated as DL subframes. FIG. 4 shows examples of TDD UL/DL configurations with subframe arrangements.

FIG. 5 shows examples of UL/DL switching point periodicity of the special subframe configurations described with respect to FIG. 3 including special subframes (S), DL subframes (D) and UL subframes (U). The switching from DL subframes to UL subframes may occur in subframe numbers 1 and 6.

To avoid generating severe interference on the neighboring cells, the same TDD UL/DL configuration is typically used for neighboring cells. Since change of configuration may disrupt connections, the configuration typically does not change often and may be considered static or semi-static.

The number of the TDD UL and DL HARQ processes may depend on the TDD UL/DL configuration. Intra-band carrier aggregation may be supported with aggregated carriers for TDD having the same TDD UL/DL configurations. Given the 10-subframe periodicity of MBSFN configuration patterns, in FDD the subframes {0,4,5,9} may not be configured as MBSFN subframes, whereas in TDD, the subframes {0,1,2,5,6} may not be configured as MBSFN subframes.

FIG. 6 shows an example of UL scheduling timing for various TDD configurations. By way of example, for TDD UL/DL configuration 1, if a UL grant is received in the DL in subframe n=1, then from FIG. 6, k=6 and the grant is for a PUSCH in subframe n+k=1+6=7, where n is an integer, and k is an integer greater than zero. If, for TDD UL/DL configuration 0, the least significant bit (LSB) of the UL index in the downlink control information (DCI) format 0/4 is set to 1 in subframe n, or a PHICH is received in subframe n=0 or 5 in the resource corresponding to $I_{PHICH}=1$, or PHICH is received in subframe n=1 or 6, the WTRU adjusts the corresponding PUSCH transmission in subframe n+7. If, for TDD UL/DL configuration 0, both the most significant bit (MSB) and LSB of the UL index in the PDCCH with UL DCI format may be set in subframe n, the WTRU may adjust the corresponding PUSCH transmission in both subframes n+k and n+7, with k as in FIG. 6.

TDD DL scheduling timing is the same as that of FDD. That is the WTRU may receive the scheduling grant for a DL transmission in the same subframe. TDD DL HARQ protocol may be asynchronous and adaptive, which means that there is always a PDCCH carrying a DL grant for every DL re-transmission. Given the UL scheduling and re-transmission timing, for TDD UL/DL configurations 1-6, upon detection of a PDCCH with UL DCI format and/or a PHICH transmission in subframe n intended for the WTRU by that WTRU, the WTRU may adjust the corresponding PUSCH transmission in subframe n+k, with k given in FIG. 6, according to the PDCCH and PHICH information. The subframe number n and k may be any whole number.

For TDD UL/DL configuration 0, upon detection by a WTRU of a PDCCH with UL DCI format and/or a PHICH transmission in subframe n intended for that WTRU, the WTRU adjusts the corresponding PUSCH transmission in subframe n+k if the MSB of the UL index in the PDCCH with UL DCI format is set to 1 or PHICH is received in subframe n=0 or 5 in the resource corresponding to $I_{PHICH}=0$, with k as in FIG. 6, where $I_{PHICH}=1$ for TDD UL/DL configuration 0 with PUSCH transmission in subframe n=4 or 9, and $I_{PHICH}=0$.

FIG. 7 shows examples of a DL association set index for TDD DL HARQ. In TDD, the DL HARQ timing mechanism is based on a concept of a bundling window which consists of a set of DL subframes. The DL HARQ feedback bits corresponding to these DL subframes may be bundled together and sent to the eNB in the same UL subframe either via a PUCCH or a PUSCH. A UL subframe n carries the DL HARQ feedback bits for M DL subframes where M>=1. Referring to FIG. 7, UL subframe n carries the DL HARQ feedback bits of each DL subframe n−k, where {$k_0, k_1, \ldots k_{M-1}$} is a set of M elements. M may be considered as the size of the bundling window in terms of DL subframes.

As an example, for configuration 1, UL subframe n=2 carries the DL HARQ feedback bits for the 2 subframes n−k where k=7 and k=6 which correspond to 2-7 and 2-6. Since the frames may be 10 subframes each, this corresponds to subframes 5 and 6 in the previous frame.

FIG. 8 shows examples of TDD UL/DL configurations of a physical HARQ indicator channel (PHICH). For PUSCH transmissions scheduled from a scheduling cell in subframe n, a WTRU determines the corresponding PHICH resource of that scheduling cell in subframe n+kPHICH, where kPHICH is given in FIG. 8. For subframe bundling operations, the corresponding PHICH resource is associated with the last subframe in the bundle.

As an example, for configuration 1, if the WTRU transmits a PUSCH in subframe n=2, then it may expect a PHICH providing the UL HARQ-ACK feedback in subframe n+kPHICH, i.e., subframe 2+4=6.

Power control (PC) and power headroom (PH) may be defined for a single serving cell for each of PUCCH and PUSCH. PC has an open loop component and a closed loop component. The WTRU uses measured pathloss and parameters the WTRU has or can compute, such as the size of the UL grant, to determine the open loop component, and accumulated or absolute TPC bits as the closed loop component, to determine the transmit power for PUSCH or PUCCH in a subframe. PUSCH power control may support both accumulated TPC and absolute TPC. PUCCH power control may support accumulated TPC. Before finalizing the power to use for transmission, the WTRU compares its computed power, determined from the open and closed loop components, with its configured maximum output power (Pcmax). The configured maximum output power is the lesser of signaled maximum power and power class less allowed power reductions. The power reductions may be a function of the transmitted signal and may be used to ensure the WTRU does not violate spectral emissions and other transmit requirements. If the computed power exceeds Pcmax, the transmit power is set equal to Pcmax and this is the power used for transmission; otherwise the computed power is used for the transmit power. PH is the difference between Pcmax and the computed transmit power. PH is a way to tell the eNB whether the WTRU is able to transmit more power (positive headroom) or if it is over its limit (negative headroom). PH is used by the eNB scheduler in its scheduling decisions. For example, if the headroom is positive, the eNB may schedule a larger grant. If the headroom is negative, the eNB should reduce the size of the grant. Power headroom reports (PHRs) may be configured to be sent to the eNB periodically, and may be event triggered, such as when pathloss changes are required based on more than one threshold.

The PC and PH concepts may be extended to simultaneous UL transmission on multiple cells. The power on each serving cell for which there is transmission is first computed independently of the other serving cells. Each serving cell has its own configured maximum output power (Pcmax,c). Pcmax,c includes allowed power reductions to meet spurious emissions and other transmit requirements. Additional reductions may be allowed for other factors such as power management to meet SAR or other non-LTE specific requirements and reductions for inter-modulation effects when transmitting inter-band.

If any serving cell's computed transmit power would exceed its Pcmax,c, its computed transmit power is set equal to Pcmax,c. For the Pcell which may have simultaneous transmission of both PUCCH and PUSCH, the PUCCH power is computed first and limited by Pcmax,c for the Pcell. Then the PUSCH power is computed for the Pcell, where its power is limited by Pcmax,c for the Pcell minus the power allotted to the PUCCH. In addition to the configured maximum output powers for the individual serving cells, there is also a configured maximum output power (Pcmax) for the WTRU as a whole. If the sum of the individual computed transmit powers would exceed Pcmax, the channel powers eters and may be provided to the WTRU via RRC signaling. $PL_c$ is the pathloss term for the CC. $g(i)$ is an adjustment factor, referred to as the PUCCH power control adjustment state, that includes the power ramp-up delta after a random access channel (RACH), (which may be zeroed if a new $P_O$ is signaled), and the accumulation of TPC commands, $\delta_{PUCCH}$. Accumulation may be computed as:

$$g(i)=g(i-1)+\Sigma_{m=0}^{M-1}\delta_{PUCCH}(i-k_m), \quad \text{Equation (2)}$$

where, for FDD, M=1 and $k_0$=4, and for TDD, values of M and $k_m$ are given in FIG. 7.

TPC commands for PUCCH may be transmitted in PDCCH format 3/3A or with DL grants in PDCCH formats 1A/1B/1D/1/2A/2B/2C/2, and may be +1 or −1 dB in format 3A or 0 (hold), −1, +1, or +3 dB in the other formats. If the PDCCH with DCI format 1/1A/2/2A/2B is validated as a semi-persistent scheduling (SPS) activation PDCCH, or the PDCCH with DCI format 1A is validated as an SPS release PDCCH, then $\delta_{PUCCH}$ may be 0 dB.

PUSCH power control may be computed as:

$$P_{PUSCH,c}(i) = \min\left\{\begin{array}{l}10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j)\cdot PL_c + \Delta_{TF,c}(i) + f_c(i)\end{array}\right\}, \quad \text{Equation (3)}$$

may be scaled according to a set of priority rules such that Pcmax is not exceeded. PUCCH has the highest priority, PUSCH carrying UCI has the next highest priority, and all other PUSCH have the lowest, but equal amongst themselves, priority. PH may be computed for each serving cell as the difference between Pcmax,c and the computed transmit power before being limited by Pcmax,c and power allocation to a higher priority channel. For Pcell, a Type 1 PH for the PUSCH may be computed as if the PUCCH did not exist (even if it does), and a Type 2 PH may include both the PUSCH and the PUCCH. A power headroom report (PHR) may include the PH values for all active serving cells and their corresponding Pcmax,c values. Special rules may be followed when reporting PH for a serving cell that does not have a UL transmission in the subframe in which the PHR is sent. PH may be considered real for a channel that has a transmission and virtual for a channel that does not have a transmission in the subframe in which a PHR is sent.

A PUCCH power control equation may be computed as:

where the PUCCH term may only be present when PUSCH and PUCCH may be transmitted simultaneously in the subframe i.

The parameters in Equation (3) may be similar to those described for PUCCH power. For PUSCH, the adjustment factor may be an accumulation of TPC commands and may be represented by a CC specific term, fc(i).

Subframe-dependent UL power control and Interference measurement and signaling are described. Subframe-dependent UL power control may include TPC operation, PH operation, and other UL subframe set specific power control parameters.

A WTRU may adjust its transmission power as a function of UL subframe and/or UL subframe position and/or UL transmission type. A WTRU may take into account one or more parameters and factors to calculate the UL transmit power in a UL subframe. These parameters and/or factors may be referred to as power control components. Examples of power control components may include, but not limited $$P_{PUCCH}(i) = \min\left\{\begin{array}{l}P_{CMAX,c}(i), \\ P_{O\_PUCCH} + PL_c + h(n_{CQI}, n_{HARQ}, n_{SR}) + \Delta_{F\_PUCCH}(F) + \Delta_{TxD}(F') + g(i)\end{array}\right\}, \quad \text{Equation (1)}$$

where $P_{CMAX,c}(i)$ is the configured maximum output power for component carrier (CC) c and it may be configured by the WTRU to a value between a high value equal to MIN(Pemaxc, Ppowerclass) and a low value equal to the minimum of Pemax,c and Ppowerclass minus a combination of allowed power reductions. Depending on the situation, this may include one or more of maximum power reduction (MPR), additional MPR (A-MPR), power management MPR (P-MPR), deltaTc, and deltaTib. Pemaxc is a maximum allowed output power for CC c signaled to the WTRU via radio resource control (RRC) signaling as p-max for that CC. $\Delta_{F\_PUCCH}(F)$ is a function of the PUCCH format used for the transmission. $h(n_{CQI},n_{HARQ},n_{SR})$ is a function of the PUCCH format and the number of bits of each type being transmitted. $P_{O\_PUCCH}$ is a parameter composed of 2 paramto, a TPC format, a TPC command accumulation mechanism, a pathloss factor, and the like. A WTRU may apply one or more UL power control components to possibly all subframes in a set of UL subframes and/or to a UL transmission type (such as PUCCH, PUSCH, SRS, etc.).

A set of UL subframes may be identified as one or combination of the following:

1) A selection of subframes out of total number of potential UL subframes. A WTRU may consider a subframe as a potential UL subframe if it may initiate a UL transmission in that subframe. As an example, a subframe which may be indicated as a DL subframe in the cell-specific UL-DL TDD configuration but at the same time may be used by a WTRU for UL transmission may be considered a potential UL subframe possibly for that WTRU.

2) A subframe which may be considered as a DL subframe for other WTRUs.

3) A subframe which may be considered as a dynamic subframe whose direction may change from DL to UL or vice versa from one radio frame to another.

4) A subframe pattern.

5) The subframe pattern of a set of UL subframes may be repeated by a certain periodicity. For example, a subframe pattern may be repeated every radio frame (every 10 ms), every 4 radio frames (every 40 ms), etc.

6) A superset or subset of another set of UL subframes.

7) A subframe may belong to more than one set of UL subframes.

8) A set of UL subframes may be signaled to a WTRU and/or implicitly derived by the WTRU as a function of one or more factors such as TDD UL-DL configuration, UL transmission type, other sets of UL subframes, etc. For example, a WTRU may have two sets of UL subframes and it may implicitly derive a third set as the common potential UL subframes between the two sets (e.g., intersection of UL subframes of those two sets).

9) Different UL transmission types, e.g., PUCCH, PUSCH, SRS, and the like, may have different sets of UL subframes, which may or may not include the same UL subframes.

10) Sets of UL subframes may be mutually exclusive, e.g., a UL subframe, or a UL subframe in a given frame may belong to one UL subframe set and this may apply for all UL transmission types.

11) Sets of UL subframes may be mutually exclusive with respect to a UL transmission type, e.g., a UL subframe to be used for one transmission type (e.g., PUSCH) may belong to one subframe set while that same subframe may belong to another subframe set for another transmission type (e.g., PUCCH).

12) UL subframe sets may apply to all of a WTRU's configured or activated serving cells or may be serving cell specific.

A UL subframe set may be used interchangeably with set of UL subframes.

UL subframe set and subframe set may be used interchangeably. Set of UL subframes and set of subframes may be used interchangeably.

Which subframes belong to a UL subframe set may be implicitly and explicitly determined and indicated, for example by the WTRU and to the WTRU by the eNB. A WTRU may receive an indication from the eNB indicating one or more sets of subframes, which may be independent of whether those subframes may be considered UL or DL by the WTRU and eNB at the time. A WTRU may, for example in a frame or a given point in time, determine the sets of UL subframes (e.g., the actual or effective UL sets of subframes) explicitly and implicitly, e.g., as a function of the received indication of sets of subframes, the effective TDD UL/DL configuration at the time, the indication of the UL/DL direction of subframes, and possibly other parameters.

For example, the WTRU may receive or otherwise obtain two sets of subframes, which may be regardless of those subframes being UL or DL at the time. The WTRU may determine a set of UL subframes corresponding to each of those indicated sets of subframes possibly by applying the intersection to the subframes in the received set of subframes and the UL subframes which may be indicated to and/or determined by the WTRU at the time. Examples of the UL subframes indicated to and/or determined by the WTRU may be the UL subframes indicated in a TDD UL/DL configuration, the UL subframes indicated to the to WTRU as a part of an indication of UL/DL direction of subframes, etc.

In another example, the WTRU may receive or otherwise obtain and maintain a number of sets of subframes, such as 2, which may be regardless of those subframes being UL or DL at the time. In each UL subframe in which the WTRU may transmit or intend to transmit, the WTRU may determine to which set that UL subframe may belong, for example for that transmission, and may use the subframe set dependent parameters accordingly such as for determination of transmission power, PH, and the like.

The subframe pattern of a set of UL subframes may be implicitly and/or explicitly indicated by one or a combination of the following mechanisms.

1) A bit-sequence may be used to represent a certain number of consecutive subframes, regardless of those subframes being UL or DL, where each bit may indicate whether that subframe may belong to the corresponding set of UL subframes. For example, a bit-sequence of 10 bits may represent all subframes in one radio frame where the first bit may refer to the first subframe and the last bit may refer to the last subframe of the radio frame, e.g., [0,0,1,1,0,0,0,1,0,0] may indicate that the subframes #2, #3 and #7 may be part of a certain set of UL subframes which may be in every radio frame, and which may mean that the pattern may be repeated every radio frame.

2) A bit-sequence may be used to represent a certain number of subframes, regardless of those subframes being UL or DL, where each bit may indicate whether that subframe may belong to the corresponding set of UL subframes. The bits in the bit sequence may correspond to a certain subset of subframes which may be based on the cell specific UL/DL configuration. The subset of subframes may exclude subframes which may be known to not be potential UL subframes, for example subframes 0 and 5 which may or may always be DL. Another example may include subframe 1 which may be a special subframe. Another example may include subframe 6 for certain cell specific UL/DL configurations for which subframe 6 may be a special subframe.

The value of each bit in the pattern may indicate that the corresponding subframe may belong to a certain set of UL subframes. For example, a value such as 1 may indicate that the corresponding subframe may belong to a certain set of UL subframes and, another value such as 0 may indicate that the subframe may belong to another set of UL subframes. For example, a bit-sequence of 7 bits may represent the certain subset of subframes in one radio frame where the first bit may refer to the first potential UL subframe and the last bit may refer to the last potential UL subframe of the radio frame, e.g., [1,1,0,0,1,0,0] may be used to indicate the potential UL subframes 2, 3, 4, 6, 7, 8, 9 and may indicate that the subframes #2, #3 and #7 may be part of a certain set of UL subframes which may be in every radio frame and which may mean that the pattern may be repeated every radio frame. This pattern may also indicate that the subframes #4, #6, #8, and #9 may belong to another set of UL subframes.

Since subframe 2 may always be UL, subframe 2 may implicitly be known to belong to a certain set of UL subframes and no bit may be needed for that subframe. For example, a 6-bit bit sequence may be used to represent subframes 3, 4, 6, 7, 8, 9. One value, (e.g., 1), may be used to indicate which of those subframes belong to one set of UL subframes and another value, (e.g., 0), may be used to indicate which of those subframes belong to another UL set of subframes. It may be a priori understood to which set subframe 2 may belong.

The number of bits to use and what subframes they correspond to may be a function of the cell specific UL/DL configuration and may correspond to the number of UL subframes in that configuration or the number of UL subframes in that configuration which are not a priori known to belong to a particular set of UL subframes. For example, subframe 2 may be excluded from the bits since it may always be UL.

3) A predefined or configured set of UL subframe set combinations may be used. A WTRU may be informed which combination to use. The set of combinations may be a function of the cell specific UL/DL configuration. For example, for TDD UL/DL configuration 1, there are 4 UL subframes, subframes 2, 3, 7, 8. The allowed combinations may include: Set 1={2}, Set 2={3, 7, 8}; Set 1={2, 3}, Set 2={7, 8}, Set 1={2, 3, 7}, Set 2={8}; Set 1={2, 7}, Set 2={3, 8}; Set 1={2, 3, 7, 8}, Set 2={ }. In this example, there are 5 possible combinations with one combination including all the UL subframes in one set. The combination choice may be provided to a WTRU using 3 bits for one of 5 combinations. The combination that includes all the UL subframes in one set may be excluded from the choices and the WTRU may understand that if no such configuration is provided all the UL subframes may be in the same UL set of UL subframes. Then, for the example, 2 bits may be used to signal a combination choice.

A WTRU may receive and maintain separate sets of subframes, regardless of those subframes being considered DL or UL, for example at a given time. This may include, for example by one or more of the WTRU, another WTRU, or the eNB. The subframe sets may correspond to certain criteria such as different levels of interference, for example as perceived by at least one WTRU and the eNB where such perception may be based on measurements. For example, the WTRU may receive and maintain two sets where one set may represent the subframes which may be considered or may be experiencing high interference or may be experiencing low interference. This may be referred to as the "high-interference" set, and the other may represent the subframes that may be considered, which may be referred to as the "low-interference" set. Although examples may consider the case of maintaining and receiving two sets of subframes, solutions described herein may be applied to any number of sets of subframes.

A WTRU may be implicitly or explicitly configured to operate with UL subframe sets. A WTRU may operate or assume operation without UL subframe sets until explicitly configured with one or more UL subframe sets. Operation without UL subframe sets may be the same as operation with a single UL subframe set where certain subframes such as all or all UL subframes may belong to that set. A WTRU may operate or assume operation with UL subframe sets (or operation with more than one UL subframe set) based on configuration of a WTRU specific TDD UL/DL configuration and may derive the UL subframe sets, for example from at least one of that configuration and the cell specific or SIB1 TDD UL/DL configuration. A WTRU may receive an explicit configuration or reconfiguration (e.g., from an eNB such as by signaling) to release or stop operating with UL (e.g., multiple UL) subframe sets or with a certain UL subframe set. Following receipt of such configuration or reconfiguration, the WTRU may stop operating with the certain UL subframe set or with multiple UL subframe sets. A WTRU may autonomously release or stop operating with UL (e.g., multiple UL) subframe sets based on a certain event such as radio link failure (RLF).

When a WTRU does not operate with UL subframe sets (such as a legacy WTRU or a WTRU without configured UL subframe sets or parameters for UL subframe sets, for example), the PC components and parameters provided by existing signaling may be applicable to or used by the WTRU for PC and PH calculations. For example, for certain subframes, such as all UL subframes in which it may transmit in the UL or, such as in the case of PH, in which it may transmit a PHR.

When a WTRU does operate with UL subframe sets, the WTRU may determine which PC components and parameters to use based on one or more of PC components and parameters provided by signaling, such as existing signaling, may be used by the WTRU for one of the UL subframe sets; signaling, such as existing signaling, used to modify one or more of these PC components and parameters; signaling, such as additional signaling, provided by the eNB and received by a WTRU which indicates PC components and parameters for one or more other UL subframe sets, such as a second UL subframe set; and signaling, such as additional signaling, used to modify one or more of these PC components and parameters or to release or terminate the use of PC components and parameters for one or more other UL subframe sets, such as a second UL subframe set.

The signaling may be RRC signaling, such as from the eNB to the WTRU. The signaling which provides the PC components and parameters may also include an indication in which subframes those PC components and parameters may be used. Separate signaling may also be used.

The subframes in a set may be the same as for which subframes to apply a certain set of power control (PC) components and parameters including for PC and PH. Signaling of such linkage may be semi-static such as by RRC signaling, by MAC, or dynamic including physical layer signaling. A WTRU may be configured with one fewer set of subframes than it may be intended to use. The subframes not included in any of the configurations may be understood to be in the remaining set as the default or reference set.

The WTRU may receive an indication of the sets of UL subframes from the eNB. This may be semi-static or dynamic, which may be valid for a predefined, possibly minimum, period of time. A WTRU may receive an indication of one or more sets of UL subframes from the eNB in a semi-static manner, such as by RRC signaling. Upon receipt of one or more new UL subframe sets, the WTRU may discard previously stored UL subframe sets and may begin using the new UL subframe set or sets. A WTRU may receive the indication in a predefined periodic manner, such as in the first subframe of every 4 radio frames, for example, in a 40-msec interval. A periodic indication may or may not contain the same information as in the previously received indication. A WTRU may receive the indication when the WTRU may be required to change the set of UL subframes. For example, the WTRU may blindly search the first subframe of every radio frame to detect such indication. A WTRU may receive such indication as a part of physical layer signaling. For example, such information may be conveyed to the WTRU via a DCI, which may be different for each WTRU and common between a group of the WTRUs. A WTRU may receive an indication in the signaling which may contain an indication to change the UL/DL subframe ratio or subframe directions. For example, the subframe set indication may be included in the same signaling which may provide a new WTRU or procedure-specific TDD UL/DL configuration or in the same signaling which may provide an indication of UL/DL direction of subframes, for example. In an example, a common DCI may be sent to certain WTRUs, which may contain the information required implicitly and explicitly to change the ratio of the UL/DL subframes (e.g., an indication of different UL/DL direction of subframes) as well as the indication of the sets of subframes.

A WTRU may receive an indication of a timeframe that an indication of sets of subframes may be valid. For example, the WTRU may be configured to use an indication of sets of subframes for 4 radio frames and after that the WTRU may follow a predefined procedure, e.g., following a predefined sets of subframes, using a single set for all (UL) subframes, for example. Upon the reception of the indication of sets of subframes in a radio frame, the WTRU may apply the new sets of subframes at the beginning of the next radio frame. The WTRU may also receive a timing indication on when to apply the received sets of subframes. The WTRU may receive such timing indication along with the indication of sets of subframe and the WTRU may be preconfigured with such parameter. Upon the reception of the indication of sets of subframes in a radio frame, the WTRU may apply the new sets of subframes at a specific subframe with respect to the subframe in which the indication is received, including within the same radio frame. For example, the WTRU may change the sets of subframes after k subframes (e.g., k equal to 4) of the reception of the indication of such sets of subframes. For example, given the subframe in which the indication may be received is subframe n, the application of the sets by the WTRU may be in subframe n+k where k may be a function of one or more of the WTRU and cell specific TDD UL/DL configurations and the UL/DL directions which may be in effect at that time. One or more of the following may apply:

Subframe n+k may be the first UL subframe where k is greater than or equal to 4.

Subframe n+k may be the subframe which may be scheduled for UL transmission according to one of the WTRU and cell specific TDD UL/DL configurations Subframe n+k may be the first UL subframe greater than or equal to the subframe which may be scheduled for UL transmission according to one of the TRU and cell specific TDD UL/DL configurations At least two UL power control component sets may be configured and one of the UL power control component sets may be selected dynamically. Power control component and power control component set may be used interchangeably herein. A power control component set may include one or more power control components. UL power control and power control may be used interchangeably. A power control component set may include power control components for multiple transmission types (e.g., PUCCH, PUCCH, SRS, PRACH). There may be a separate power control component set for each transmission type or certain transmission types.

When configuring, indicating, determining, selecting, maintaining, applying or otherwise using or addressing power control component sets (or subframe sets), for a particular transmission type, the sets involved may be those corresponding to the transmission type and may be independent of how the sets may be organized with regard to transmission types.

Selection by the WTRU of a UL power control component set, for example for use in determining power for a transmission or PH in a subframe, may be based on semi-static or dynamic linkage of subframes and transmission types with UL power control component sets. UL power control component set and UL subframe set may be used interchangeably herein.

One or more UL power control component sets may be configured and one of the UL power control component sets may be determined by or selected based on an explicit indication in a DCI for a corresponding UL transmission. A UL power control component set indicator (UPCCI), which may be represented by a bit, bit field, or DCI to indicate which UL power control component set may or should be selected or applied, for example by a WTRU, for the corresponding UL transmission. An indication may be specific to a certain one or more transmission types.

A UPCCI may be included in one or more DCI formats related to a UL grant for a PUSCH. For example, DCI formats 0 and 4 may include a UPCCI for example if a WTRU is configured with a dynamic or WTRU-specific TDD UL/DL subframe configuration, and/or if the WTRU is configured to operate with multiple UL subframe sets or multiple power control component sets.

For UPCCI, an $N_{SET}$ UL power control component sets may be configured, a $[\log 2 (N_{SET})]$ UPCCI bit field may be included in a DCI for UL grant. Each bit status may be mapped to a non-overlapped UL power control component set. If two UL power control component sets are configured or maintained, a 1 bit UPCCI bit field may be included, for example if a WTRU is configured with dynamic or a WTRU specific TDD UL/DL subframe configuration and if a WTRU is configured to operate with multiple UL subframe sets or multiple power control component sets. If the UPCCI indicates '0' then the WTRU may use a first UL power control component set for corresponding UL transmission, and if the UPCCI indicates '1' then the WTRU may use a second UL power control component set for corresponding UL transmission, or vice versa. If multiple UL power control component sets are configured, multiple cell radio network temporary identifiers (C-RNTIs) may be used to indicate which UL power control component set needs to be selected. For example, if two UL power control component sets are configured, a WTRU may be configured with two C-RNTIs such as C-RNTI-1 and C-RNTI-2, and if the WTRU decodes (enhanced) PDCCH ((E)PDCCH) with C-RNTI-1 then the UL power control component set associated with C-RNTI-1 may be selected for corresponding UL transmission.

Figures 9, 10:
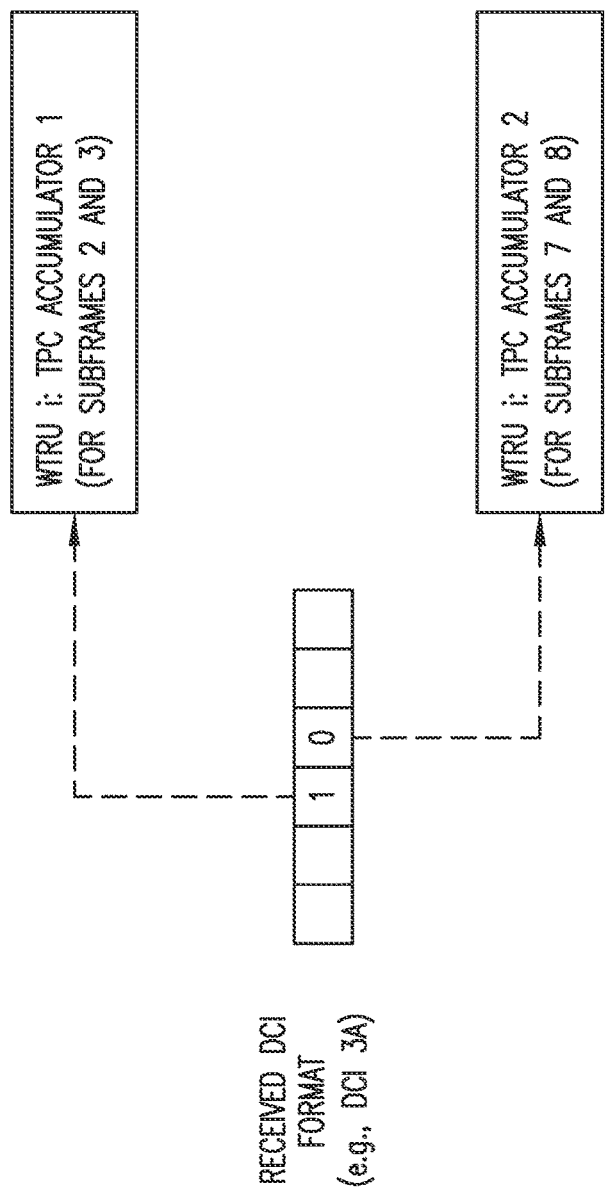
FIG. 9 shows an example of a UL power control component set selection mask.
FIG. 10 shows an example of a TDD UL/DL configuration scheme used by a WTRU to maintain two sets of UL subframes.

FIG. 9 shows an example of a UL power control component set selection mask. Alternatively, a cyclic redundancy check (CRC) mask may be used for a C-RNTI configured for the WTRU as shown in FIG. 9, as an example in which two UL power control component sets are assumed but not limited.

A UPCCI may be included in one or more DCI formats related to downlink assignment for PDSCH. The UPCCI may include certain of DCI formats related to PDSCH transmission that may be a subset of the DCI formats related to PDSCH transmission. The certain DCI formats may be determined by the supportable transmission modes for dynamic TDD UL/DL subframe configuration. For example, the DCI formats supporting DM-RS (e.g., antenna port 7-14) based transmission may support or include UPCCI. DCI formats not supporting DM-RS may not support or include UPCCI. Certain transmission modes may support multiple UL power control component sets. Certain other transmission modes may not support multiple UL power control component sets. If a WTRU is configured with a transmission mode which may not support multiple UL power control component sets then the WTRU may assume dynamic TDD UL/DL subframe configuration is not used or that multiple subframe sets are not used or that multiple power control component sets are not used. If a WTRU is configured with a transmission mode which may not support multiple UL power control component sets then the WTRU may assume that DCIs intended for that WTRU may not include UPCCI. If multiple UL power control component sets are configured, multiple C-RNTIs may be used to indicate which UL power control component set needs to be selected. For example, if two UL power control component sets are configured, a WTRU may be configured with two C-RNTIs such as C-RNTI-1 and C-RNTI-2, and if the WTRU decodes (E)PDCCH with C-RNTI-1 then the UL power control component set associated with C-RNTI-1 may be selected or used by the WTRU for corresponding UL transmission. Alternatively, a CRC mask may be used for a C-RNTI configured for the WTRU as shown in FIG. 9 in which the UL power control component set selection mask may be applied for the C-RNTI configured for the WTRU.

TPC command may be transmitted in DCI formats with explicit UPCCI. A TPC command in a DCI including UPCCI may be applied for the UL power control component set indicated by UPCCI. For example, if a WTRU receives DCI format 0 or 4 for UL grant, and the UPCCI indicates a specific UL power control component set, the WTRU may apply the TPC command to the corresponding UL power control component set. A TPC command in a DCI including UPCCI may be applied for the UL power control component set associated with the subset of subframes configured as a default configuration or the UL power control component set configured as or known to be the default set. In this case, the TPC command may be applied to a UL power control component set independently from the UPCCI in the DCI. The TPC command may be used to adjust UL power control component sets based on subframe and SFN index while UPCCI may be used to select a UL power control component set for a corresponding UL transmission.

The TPC command in DCI format 3/3A may be applied for multiple UL power control component sets and explicit indication may be used. UPCCI bit field may be introduced in DCI format 3/3A and the group TPC command in DCI format 3/3A may be applied for the corresponding UL power control component set indicated by UPCCI. For multiple UL power control component sets, multiple TPC-PUCCH-RNTI and TPC-PUSCH-RNTI may be defined. For example, if two UL power control component sets are configured, two TPC-PUCCH-RNTIs may be defined such as TPC-PUCCH-RNTI-1 and TPC-PUCCH-RNTI-2. If a WTRU decodes PDCCH with the CRC scrambled with TPC-PUCCH-RNTI-1, then the WTRU may apply the TPC command to the UL power control component set associated with TPC-PUCCH-RNTI-1. The same may apply for TPC-PUSCH-RNTI. For the multiple TPC-PUCCH-RNTI and TPC-PUSCH-RNTI, CRC mask may be used instead of configuring multiple RNTIs explicitly.

In another solution, one or more UL power control component sets may be configured and one of the UL power control component sets may be determined by an implicit indication in a DCI. The (E)PDCCH search space may be split into the number of UL power control component sets and each subset of (E)PDCCH search space may correspond to a non-overlapped UL power control component set. If a WTRU decodes a (E)PDCCH with CRC scrambled by C-RNTI within a specific subset of search space, the UL power control component set may be determined by the subset of search space in which the WTRU receives (E)PDCCH. The (E)PDCCH search space may be WTRU-specific search space for the DCIs related to PUSCH and PDSCH. The subset of EPDCCH search space may be defined as EPDCCH resource group. For example, two EPDCCH resource groups may be defined and the EPDCCH candidates in the first EPDCCH resource group may be associated with the first UL power control component set and the EPDCCH candidates in second EPDCCH resource group may be associated with the second UL power control component set.

The group TPC command (i.e., DCI format 3/3A) may be applied for multiple UL power control component sets and implicit indication may be used. The subframe sets may be configured via higher layer and the group TPC command may be applied according to the subframe in which a WTRU receives the group TPC command. (E)PDCCH search space may be split into the number of UL power control component sets and the group TPC command may be applied to the corresponding UL power control component set according to the subset of (E)PDCCH search space in which the WTRU receives group TPC command. For example, if two UL power control component sets are configured then two subsets of (E)PDCCH search space for DCI format 3/3A may be defined. Each subset of (E)PDCCH search space may correspond to each UL power control component set so that if a WTRU receives TPC command in the first subset of (E)PDCCH search space, the WTRU may apply the TPC command to the first UL power control component set. Otherwise the WTRU may apply the TPC command to the second UL power control component set.

In another solution, one or more UL power control component sets may be configured and one or more subframe sets, such as corresponding subframe sets, may be configured as default. The UPCCI in a DCI may override a default UL power control component set. As a default configuration, the subframes may be split into the number of UL power control component sets and each subset of the subframes may be tied with a non-overlapped UL power control component set. For example, if two UL power control component sets are configured, two subsets of subframes may be configured such as subset-1 and subset-2 where the subset-1 may be associated with the first UL power control component set and the subset-2 may be associated with the second UL power control component set. A certain set of power control components may be the default set. This set may be the default set for certain subframes or all subframes. There may be a different default set for different transmission types. If a WTRU is configured with, or otherwise expects to receive, or receives UPCCI, then the WTRU may select a UL power control component set based on the UPCCI for the corresponding UL transmission irrespective of the default configuration.

For a UL transmission without associated (E)PDCCH such as SRS, periodic PUCCH reporting, and SPS transmission, one or more of the following may apply: a WTRU may select a UL power control component set based on the default configuration; a WTRU may select the default UL power control component set or the default UL power control component set for the transmission type; and a WTRU may select a UL power control component set based on the latest (e.g., most recent) UL power control component set indicated by UPCCI.

For a UL transmission without associated (E)PDCCH coinciding with a UL transmission with (E)PDCCH, one or more of the following may apply. A WTRU may select the same UL power control component set for the UL transmission without associated (E)PDCCH as for the UL transmission with an associated (E)PDCCH. A WTRU may select an independent UL power control component set for the UL transmission without associated (E)PDCCH and the UL transmission with associated (E)PDCCH. If a WTRU is not configured with or does not expect to receive, or does not receive UPCCI, the WTRU may select a UL power control component set based on the default configuration. The default configuration may be used for the UL transmission without associated (E)PDCCH and the UPCCI may be used for the UL transmission with associated (E)PDCCH. The group TPC command (i.e., DCI format 3/3A) may be applied based on the default configuration. The TPC command for DCI formats related to PUSCH and PDSCH may be applied based on UPCCI.

In one solution, the UL power control component set may be selected for a sounding reference signal (SRS) transmission based on at least one of the following. The UL power control component set for SRS transmission may be fixed to one of the UL power control component sets. For example, the first UL power control component set may be used for SRS transmission. The first UL power control component set may be reconfigured as a single power control component set if multiple UL power control component sets become a single UL power control component set via higher layer configuration. A single power component set may be reconfigured as the first UL power control component set if a WTRU is reconfigured from a single UL power control component set to multiple UL power control component sets. In this case the first UL power control component set may be kept irrespective of the reconfiguration of the number of UL power control component set. The UL power control component set for SRS transmission may be configured in a semi-static manner between one of the UL power control component sets. One of the UL power control component sets may be selected based on higher layer signaling and may be used until the WTRU is reconfigured. One of the UL power control component sets may be selected based on WTRU-ID (e.g., C-RNTI). For example, modulo operation may be used with WTRU-ID to select a UL power control component sets for SRS transmission. In an example, UPCCI=WTRUID mod $N_{SET}$, where $N_{SET}$ denotes number of UL power control component sets configured. The UL power control component set for SRS transmission may be determined based on default configuration in which subframe subsets may be configured for a specific UL power control component set.

In another solution, the UL power control component set may be selected for the semi-persistent scheduling (SPS) transmission. The UL SPS transmission may be allowed only in a subset of subframes associated with a specific UL power control component set. For example, a WTRU may transmit SPS packet only in a UL subframe associated with the first UL power control component set in a default configuration and the WTRU may skip/drop/hold the SPS packet in the subframe associated the other UL power control component set. In another example, a WTRU may transmit SPS packet only in a UL subframe associated with a specific UL power control component set indicated by "UPCCI=k" where k may be predefined or configured by higher layer. The UL power control component set selection for UL SPS transmission may be based on default configuration. Therefore, a WTRU may determine the UL power control component set based on the subframe on which the WTRU may transmit an SPS packet.

An enhanced DCI, or "e-DCI", may be a DCI including UPCCI and dynamic TDD UL/DL subframe configuration such as subframe directions. A "normal" DCI may be a DCI which does not include UPCCI and dynamic TDD UL/DL subframe configuration. The e-DCI may be the same DCI format as normal DCI except for inclusion of UPCCI and dynamic TDD UL/DL subframe configuration. In a solution, a WTRU may monitor either e-DCI or normal DCI. The DCI to monitor in a subframe may be based on higher layer configuration. A WTRU may be configured via higher layer to monitor either e-DCI or normal DCI in a semi-static manner. If configured for e-DCI, the WTRU may monitor e-DCI, for example in each subframe it monitors DCI for the DCI formats for which e-DCI may apply. If not configured for e-DCI, the WTRU may monitor normal DCI in each subframe where it monitors DCI. If a WTRU is configured to operate with dynamic TDD UL/DL subframe configuration, for example if the WTRU is configured with a WTRU specific UL/DL subframe configuration, e-DCI may be used (e.g., monitored) by the WTRU automatically, for example in each subframe it monitors DCI. Otherwise, normal DCI may be used (e.g., monitored by the WTRU). A subset of subframes may be used for monitoring normal DCI irrespective of the configuration to operate with dynamic TDD UL/DL subframe configuration. This may be used as a fall back transmission which may be needed for the ambiguity period for reconfiguration. MAC CE may be used for the configuration between e-DCI and normal DCI. A WTRU may be configured to monitor e-DCI in a subset of subframes. The subframes for e-DCI may be configured via higher layer signaling or broadcasting channel.

In a solution, a WTRU may monitor e-DCI in certain subframes of certain frames. In those certain subframes of those certain frames, the WTRU may not monitor normal DCI for example of the same format type as the e-DCI being monitored.

The subframes in which to monitor e-DCI may be known or may be based on configuration by higher layers. Configuration to monitor e-DCI may be explicit or implicit based on another configuration such as configuration to operate with dynamic TDD UL/DL subframe configuration (e.g., configuration of a WTRU specific UL/DL configuration) or configuration of UL power control component sets. The e-DCI may provide the linkage of a power control component set to each of one or more subframes or transmissions. For example, in a frame with 5 potential UL subframes, linkage may be provided for each of the potential subframes. Linkage of a power control component set to a subframe within a frame may apply to that same subframe in one or more subsequent frames). For example, the linkage may apply until the next e-DCI providing new linkage is received.

In another solution, a WTRU may monitor either e-DCI or normal DCI in a subframe according to the subframe set configuration.

For the downlink subframes in which a WTRU may monitor (E)PDCCH corresponding to a UL subframe which is fixed to UL, then the WTRU may monitor normal DCI in the subframe. For the downlink subframes in which a WTRU may monitor (E)PDCCH corresponding to a UL subframe which is selectable between UL and downlink, then the WTRU may monitor e-DCI in the subframe.

In another solution, a WTRU may monitor either e-DCI or normal DCI according to (E)PDCCH search space.

(E)PDCCH search space may be split into two subsets and one subset may be associated with the e-DCI and the other subset may be associated with the normal DCI. For example, in the first subset, a WTRU may monitor (E)PDCCH based on e-DCI and the WTRU may monitor (E)PDCCH based on normal DCI in the second subset. The two subsets may be defined with two EPDCCH resource sets. The EPDCCH candidates in the first EPDCCH resource set may be defined as the first subset and the EPDCCH candidates in the second EPDCCH resource set may be defined as the second subset. A subset of subframes may have (E)PDCCH search space split for monitoring both e-DCI and normal DCI. Therefore, a WTRU may monitor either e-DCI or normal DCI in other subframes. The subframes having both e-DCI candidate and normal DCI candidate may be considered as a fall back subframe. If a WTRU may decode (E)PDCCH in the search space for normal DCI, the WTRU may select UL power control component sets based on one or more of the following: the first UL power control component set may be used; the UL power control component set associated with the UL subframe which is fixed as UL subframe always; and a default UL power control component set which is pre-defined.

The eNB may dynamically and periodically reconfigure the sets of UL subframes based on the level of interference in subframes. The eNB may maintain a record of the interference level in UL subframes of possibly previous radio frame(s). For example, the eNB may maintain the average (possibly through some weighting and averaging filters, for example) of interference levels of each subframe for a possibly configured number of radio frames, e.g., N radio frames. This information may be used to determine the new sets of UL subframes. Since the classification of the subframes in the UL subframe sets are based on the interference experienced, subframes sets can be categorized based on their (possibly approximate) level of interference. As an example, in the case of supporting only two sets of subframes, one can be considered as a low-interference set and the other a high-interference set.

The eNB may be configured with a minimum interference threshold, which may be represented by 'delta_min'. This minimum threshold parameter may determine whether there would be few sets or only one set of UL subframes. For example, if interference levels observed by all UL subframes are less than this threshold, only one subframe set (e.g., low-interference set) may be utilized. The value of 'delta_min' may be a function of some fixed threshold and some history of interference maintained by the eNB that may yield a better measure of the minimum and maximum interference observed in the system.

The eNB may associate every set of UL subframes with a nominal interference level, e.g., 'setX_center_delta'. The eNB may determine the nominal interference level of each set as a function of several factors such as the number of sets, TDD UL/DL configuration, interference levels of the subframes, UL/DL direction of the subframes, etc. The eNB may consider a UL subframe in Set X, if the interference level of that subframe is the closest to the nominal interference level of Set X among all sets of UL subframes.

The eNB may make use of a transition threshold, e.g., 'setX_delta_offset' corresponding to Set X, to allow for a transition of a subframe from one set to another. Once a UL subframe, e.g., subframe n, is a part of Set X, it may remain as a part of that set as long as its interference level is within the range of (setX_center_delta−setX_delta_offset) and (setX_center_delta+setX_delta_offset). The new set association of subframe n may be triggered only when the interference level of that subframe is not in the aforementioned range. This transition threshold may provide a range or hysteresis effect and may prevent a subframe from frequently switching between two different sets of subframes.

The UL subframe sets reconfiguration instant may or may not coincide with the reconfiguration of the DL/UL subframes (e.g., via change of TDD UL/DL configurations, via change of UL/DL direction of subframes, etc.) instant. In the case of such simultaneous reconfigurations, the eNB may determine the set of UL subframes based on the latest reconfiguration of the DL/UL subframes that the WTRU(s) would receive.

Upon the reception of a TPC command by a WTRU, the WTRU may apply the received TPC command to its UL transmission. The first UL subframe in which the WTRU may potentially use that TPC command for UL transmission may be referred to as the UL subframe corresponding to the TPC command. In FDD, if the WTRU receives the TPC command in subframe n, the UL subframe corresponding to that TPC command may be subframe n+4. In TDD, if the WTRU receives a PUCCH TPC command in subframe n, the UL subframe corresponding to that TPC command may be subframe n+k, where n is an integer, and k is an integer greater than zero and may be as defined in FIG. 7.

A WTRU may apply different UL power control components to different sets of UL subframes. An example of a UL power control component may be a TPC command accumulator. The WTRU may maintain and/or apply separate TPC command accumulators, TPC command accumulator values, and/or TPC command accumulator values, for different sets of UL subframes and/or for different UL transmission types. A WTRU may process a received TPC command according to one or a combination of: 1) a WTRU using the received TPC command to update at least one TPC command accumulator, TPC command accumulator value, and/or TPC command accumulator value of the UL subframe corresponding to the TPC command, and 2) a WTRU using the received TPC command to update at least one TPC command accumulator, TPC command accumulator value, and/or TPC command accumulator value of the set or sets of UL subframes to which the UL subframe corresponding to the TPC command belongs.

For a UL transmission in a UL subframe, the WTRU may calculate the UL transmission power using at least one TPC command accumulator, TPC command accumulator value, and/or TPC command accumulator value corresponding to the set or sets of UL subframes to which that UL subframe belongs. The use of multiple TPC command accumulators in a subframe may correspond to a scenario in which multiple channel types may be transmitted. TPC command accumulators may be subframe set specific and channel type specific.

FIG. 10 shows an example of TDD UL/DL configuration scheme used by a WTRU to maintain two sets of UL subframes. In this example, the first set 1 may include UL subframes 2 and 3, and the second set may include UL subframes 7 and 8. A separate TPC command accumulator may be used for each set to accumulate the UL TPC commands of the UL subframes of each set. Two TPC indexes for DCI format 3A may be used, whereby the WTRU may apply a received TPC command corresponding to the first TPC index to the TPC command accumulator of the first set, and the WTRU may apply a received TPC command corresponding to the second TPC index to the TPC command accumulator of the second set.

In another example, consider a cell with TDD UL/DL configuration 1. A WTRU may have two defined sets of UL subframes where one set includes subframes 2 and 7 and another set includes subframes 3 and 8. The WTRU may have different PUCCH TPC command accumulators for each set, $gs1(i)$ and $gs2(i)$ for S1 and S2, accordingly. When the WTRU needs to perform a UL transmission in subframes #2 and #7, it may update the TPC command accumulator $gs1(i)$, (e.g., a TPC command accumulator corresponding to the first set), by accumulating the TPC commands corresponding S1 and then it may use that accumulator to calculate PPUCCH(i). When the WTRU needs to perform a UL transmission in subframes #3 and #8, it may use the TPC command accumulator gs2(i), (e.g., a TPC command accumulator corresponding to the second set), to calculate the PUCCH power after possibly updating gs2(i) based on TPC commands corresponding to S2. For the case in which PUSCH may also be transmitted in one of these subframes, the PUSCH power calculation by the WTRU in each of these subframes may use the PUSCH TPC command accumulator, (e.g., a TPC command accumulator fs1(i) corresponding to the first set or TPC command accumulator fs2(i) corresponding to the second set), corresponding to the subset of UL subframes to which the subframe belongs if the UL subframe sets are the same for the PUSCH and PUCCH channels.

A WTRU may receive more than one (e.g., multiple) TPC commands in a DL subframe using one or a combination of: 1) receiving multiple DCI formats each containing at least one TPC command, e.g., DCI formats 0/4 for PUSCH transmission, DCI formats 1A/1B/1D/2A/2/2B/2C for PUCCH, and the like, and 2) receiving DCI formats 3/3A. In this case, the WTRU may be assigned more than one tpc-index and therefore, may be assigned more than one TPC command.

A WTRU receiving multiple TPC commands in the same subframe, may apply those TPC commands to different sets of UL subframes of the same or possibly different UL transmission types, using at least one or a combination of: 1) applying those TPC commands to the same sets of UL subframes which may be defined for different UL transmission types, with each set of UL subframes having its own TPC command accumulator, and 2) applying those TPC commands to different sets of UL subframes which may be defined for the same or different UL transmission types with some or all TCP commands not being associated to the UL subframes corresponding to those TPC commands (e.g., the rules of (n+4) for FDD and (n+k) for TDD may not be applied). A new timing may be used to associate some or all those TPC commands to the UL subframes and/or sets of UL subframes. As an example, each tpc-index may be implicitly and/or explicitly associated to a specific UL subframe and/or set of UL subframes. These indications may be a function of higher-layer configuration, the DL subframe that they are received in, the value of tpc-index, etc.

A PH report (PHR) may be transmitted by a WTRU periodically or triggered based on certain events. The parameters for periodic transmission may be configured by an eNB. The certain events may include one or more of a configuration or reconfiguration of the PH reporting functionality for example by upper layers where such configuration or reconfiguration may not be used to disable the function, a change of a pathloss by more than a threshold since the last transmission of PHR, a change of a pathloss by more than a threshold for at least one activated Serving Cell which may be used as a pathloss reference since the last transmission of PHR, expiry of a periodic timer, activation of an SCell with configured UL, a change of power backoff due to power management by more than a threshold in addition to other criteria which may need to be satisfied, (e.g., for the activated serving cell for which the power backoff changed by more than a threshold.

In order for a certain trigger condition, such as a pathloss trigger condition or a power backoff trigger condition, to be satisfied in a certain TTI, a prohibit timer may have expired in or before that TTI. In order for a certain trigger condition to be satisfied in a certain TTI, the WTRU may have UL resources for a new transmission in that TTI. Independent of what may cause a PHR to be transmitted in a certain TTI or subframe by a WTRU, a PHR may include one or more PH values for each of one or more, for example all, activated Serving Cells. Activated serving cells may be replaced herein by activated serving cells with configured UL.

The WTRU may include in the PHR Type 1 PH for each activated Serving Cell and Type 2 PH for the PCell. Inclusion of Type 2 PH may be included when the WTRU is configured, for example by the eNB, for support of simultaneous PUSCH and PUCCH. For each serving cell for which PUSCH is transmitted in the TTI of the PHR transmission, the WTRU may include a Pcmax,c that may have been used in the determination of the Type 1 PH for that serving cell. The WTRU may include the Pcmax,c that may have been used in the determination of the Type 2 PH for the PCell if PUSCH and/or PUCCH may be transmitted in the TTI of the PHR transmission.

The TTI of the PHR transmission may correspond to a particular subframe which may belong to one or more UL subframe sets for each of one or more channels which may be transmitted in that subframe. For a WTRU performing CA, the aggregated component carriers, where carriers may be used interchangeably with serving cells, may have UL subframe sets which may be the same or different. When referring to a certain serving cell it may be understood that the UL subframe sets may be the UL subframe sets of that certain serving cell.

When subscripts are shown herein to indicate serving cell specific components, e.g., power control components with subscript c, when those components also indicate a UL subframe set, e.g., S1, that UL subframe set may be specific to the serving cell c without providing an additional serving cell specific designation to the UL subframe set.

As discussed herein, a subframe belonging to a subframe set may be the same as a subframe belonging to a power control component set or a power control component set being applicable to that subframe and subframe set and power control component set may be used interchangeably.

For each serving cell c for which the WTRU may determine a PH, a WTRU may calculate or otherwise determine each PH, e.g., Type 1 and/or Type 2 PH based on the power control components corresponding to the subframe set or sets or UL power control component set or sets to which the subframe of the PHR transmission may belong.

If the subframe of the PHR transmission, subframe i, may belong to a certain UL subframe set, for example UL subframe set 1 (S1). The Type 1 PH may be calculated using one or more UL subframe set specific power control components such as a TPC command accumulator, e.g., a PUSCH TPC command accumulator fcs1(i), configured maximum output power, Pcmax,cS1(i) which may be a function of Pemax,cS1, PO_PUSCH,cS1(j) and which may be a function of PO_NOMINAL_PUSCH,cS1(j) and/or PO_WTRU_PUSCH,cS1(j) such as their sum and a pathloss factor such as αcS1(j). A TPC command accumulator shown as UL subframe set specific may be computed as:

$$PH_{type1,cS1}(i) = P_{CMAX,c}(i) - \{10 \log_{10}(M_{PUSCH,c}(i) + P_{O\_PUSCH,c}(j) + \alpha_c(j) \cdot PL_c + \Delta_{TF,c}(i) + f_{cS1}(i)\}. \quad \text{Equation (4)}$$

For an activated serving cell for which there may be no PUSCH transmission in the TTI of the PHR transmission, an alternate PH calculation may be performed and an alternate configured maximum output power, $\tilde{P}_{CMAX,c}(i)$, may be used which may assume certain allowed power reductions such as MPR, A-MPR, P_MPR and ΔTC are 0, and j may be set to 1 when determining the Type 1 PH. This alternate configured maximum output power may be UL subframe set specific. A PH determination for PHR transmission in subframe i, which may belong to UL subframe set S1 with only the TPC command accumulator, may be a UL subframe set specific and may be computed as:

$$PH_{type1,cS1}(i) = \tilde{P}_{CMAX,c}(i) - \{P_{O\_PUSCH,c}(1) + \alpha_c(1) \cdot PL_c + f_{cS1}(i)\}.$$ Equation (5)

If the subframe of the PHR transmission, subframe i, belongs to a certain UL subframe set, for example UL subframe set 1 (S1), then the Type 2 PH may be calculated using one or more UL subframe set specific power control components such as one or more TPC command accumulators, e.g., a PUSCH TPC command accumulator fcs1(i) and/or a PUCCH TPC command accumulator gs1(i), configured maximum output power, Pcmax,cS1(i) which may be a function of Pemax,cS1, PO_PUSCH,cS1(j) and which may be a function of PO_NOMINAL_PUSCH,cS1(j) and/or PO_WTRU_PUSCH,cS1(j) such as their sum, a pathloss factor such as αcS1(j), and/or PO_PUCCH,S1(j) which may be a function of PO_NOMINAL_PUCCH,S1(j) and/or PO_WTRU_PUCCH,S1(j) such as their sum. TPC command accumulators that are UL subframe set specific for the case of PUSCH and PUCCH both transmitted in subframe i may be computed as:

$$PH_{type2S1}(i) = P_{CMAX,c}(i) - 10 \log_{10}\left(\begin{array}{l} 10^{(10LOG_{10}(M_{PUSCH,c}(i)) + P_{O\_PUSCH,c}(j) + \alpha_c(j) \cdot PL_c + \Delta_{TF,c}(i) + f_{cS1}(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g_{s1}(i))/10} \end{array}\right).$$ Equation (6)

TPC command accumulators that are UL subframe set specific for the case of PUSCH transmitted and PUCCH not transmitted in subframe i may be computed as:

$$PH_{type2S1}(i) = P_{CMAX,c}(i) - 10 \log_{10}\left(\begin{array}{l} 10^{(10\log_{10}(M_{PUSCH,c}(i)) + P_{O\_PUSCH,c}(j) + \alpha_c(j) \cdot PL_c + \Delta_{TF,c}(i) + f_{cS1}(i))/10} + \\ 10^{(P_{0\_PUCCH} + PL_c + g_{s1}(i))/10} \end{array}\right).$$ Equation (7)

For an activated serving cell, e.g., the PCell, for which there may be no PUSCH and no PUCCH transmission in the TTI of the PHR transmission, an alternate PH calculation may be performed and an alternate configured maximum output power, $\tilde{P}_{CMAX,c}(i)$, may be used which may assume certain allowed power reductions such as MPR, A-MPR, P_MPR and ΔTC are 0, and j may be set to 1 when determining the Type 2 PH. This alternate configured maximum output power may be UL subframe set specific. A PH determination for PHR transmission in subframe i, where subframe i may belong to UL subframe set S1 with only the TPC command accumulators that are UL subframe set specific, may be computed as:

$$PH_{type2S1}(i) = \tilde{P}_{CMAX,c}(i) - 10 \log_{10}\left(\begin{array}{l} 10^{(P_{O\_PUSCH,c}(1) + \alpha_c(1) \cdot PL_c + f_{cS1}(i))/10} + \\ 10^{(P_{0\_PUCCH} + PL_c + g_{s1}(i))/10} \end{array}\right).$$ Equation (8)

For Type 2 PHR, if the subframe of the PHR transmission belongs to different UL subframe sets for the PUSCH and the PUCCH channels, when including the power control components for each channel in a Type 2 PH calculation, the WTRU may use the power control components corresponding to the UL subframe set to which the subframe of the PHR transmission may belong for that channel.

In Equations (4)-(8), the subscript for the UL subframe set may be dropped from the PHtype1 and PHtype2 terms, (e.g., if it is understood for which UL subframe set they may be calculated or otherwise determined).

A PHR containing PH values calculated or otherwise determined based on the subframe set or sets to which the subframe of the PHR transmission may belong, may not provide an eNB with sufficient information for proper scheduling decisions for UL subframes that do not belong to the same UL subframe set as the subframe of the PHR transmission. As an example, if the TPC command accumulator values for a PUSCH channel are different, possibly very different, for different UL subframe sets, a Type 1 PH based on one, (e.g., an S1, TPC command accumulator which may be quite different from a Type 1 PH based on another; an S2, TPC command accumulator). When an eNB receives the PH which may correspond to a subframe in S1, the eNB may not be able to easily estimate a PH for a subframe in S2 which may result in the eNB over-scheduling or under-scheduling in subframes in S2. It may, therefore be useful to provide additional information to the eNB. Even though the eNB sends the TPC commands to a WTRU, the accumulation may not be known by the eNB since the eNB may not know which of the TPC commands the WTRU may have received correctly.

A WTRU may calculate or otherwise determine a delta TPC command accumulator (DTA) value. One or more of the following may apply: the value may be the difference between a TPC command accumulator value corresponding to one UL subframe set and a TPC command accumulator value corresponding to another UL subframe set; the value may be channel specific; the reference for the calculation of the delta may be the TPC command accumulator value corresponding to the UL subframe set to which a certain subframe may belong where the certain subframe may, for example, be the subframe for a PHR transmission; the value may be in dB, the value may be limited to a certain range which may be such that if the calculated value may exceed a maximum value it may be set to the maximum value or if the calculated value is below a minimum value, it may be set to the minimum value.

The reference for the calculation of the delta may be the TPC command accumulator value corresponding to a specific UL subframe set which may be independent of the subframe set to which the subframe of the PHR transmission may belong.

For example, in subframe i, which may be a subframe in which a PHR may be transmitted by the WTRU, if subframe i belongs to one UL subframe set, e.g., S1, and does not belong to another UL subframe set e.g., S2, a serving cell c PUSCH DTA value for the other UL subframe set may be represented by DTA_PUSCH,cS2(i) and may be computed as:

$$\text{DTA\_PUSCH},cS2(i) = fcS2(i) - fcS1(i). \quad \text{Equation (9)}$$

In another example, in subframe i, which may be a subframe in which a PHR may be transmitted by the WTRU, if subframe i belongs to one UL subframe set, e.g., S1, and does not belong to another UL subframe set, e.g., S2, a PUCCH DTA value for the other UL subframe set may be represented by DTA_PUCCH,S2(i) and may be computed as:

$$\text{DTA\_PUCCH},S2(i) = gS2(i) - gS1(i). \quad \text{Equation (10)}$$

The subframe i in which a PHR may be transmitted may be referred to herein as the current subframe. For example purposes, the current subframe may belong to a certain UL subframe set, e.g., S1.

In another example, the current subframe i may belong to a certain UL subframe for each channel to be transmitted in that subframe, e.g., one subset such as S1 for PUSCH and PUCCH or one subset such as S1 for PUSCH and another subset such as S2 for PUCCH.

The DTA for each channel may use as a reference the accumulator for the subframe set to which the current subframe belongs. For example, if for a channel the current subframe belongs to S1, the DTA for another subframe set for that channel, e.g., S2, may be determined as the delta between the accumulator for that channel for S2 minus the accumulator for that channel for S1. If for a channel, such as a different channel, the current subframe belongs to a subframe set, e.g., S2, the DTA for another subframe set for that channel, e.g., S1, may be determined as the delta between the accumulator for that channel for S1 minus the accumulator for that channel for S2.

In another example, a delta which may be channel specific may be determined as the delta between the accumulator, e.g., for that channel, for a specific set such as S2 minus the accumulator, e.g., for that channel for a different specific subset such as S1. The subset to use for the reference may be signaled explicitly or may be implicitly determined by the signaling of one or more of the subframe sets, configuration of the subframes sets, configuration of the parameters associated with a subframe set (such as power control parameters). For example, by the position of the configuration of the subframe set and/or the parameters associated with the subframe sets, the WTRU may understand which subframe set or set of parameters may be considered the reference subframe subset or parameter set, (e.g., S1).

In, or for, the current subframe, a WTRU may calculate or otherwise determine one or more DTA values as follows:

1) For each PUSCH, e.g., the PUSCH for each activated serving cell, the WTRU may calculate or otherwise determine a DTA value for one or more UL subframe sets to which the current subframe does not belong. The PUSCH for which the DTA calculations may be performed may be limited to those PUSCH which may be transmitted in the current subframe. The DTA calculations may be performed for each PUSCH regardless of whether it may be transmitted in the current subframe.

2) The WTRU may calculate or otherwise determine a DTA value for the PUCCH for one or more UL subframe sets to which the current subframe does not belong. The DTA calculation may not be performed if the PUCCH may not be transmitted in the current subframe. The DTA calculation may be performed regardless of whether the PUCCH may be transmitted in the current subframe.

3) For each PUSCH, e.g., the PUSCH for each activated serving cell, the WTRU may calculate or otherwise determine a DTA value for one or more UL subframe sets where the reference for the DTA value is a specific subframe set, e.g., S1, or the parameters associated with a subframe set, e.g., S1.

4) The WTRU may calculate or otherwise determine a DTA value for the PUCCH for one or more UL subframe sets where the reference for the DTA value is a specific subframe set, (e.g., S1), or the parameters associated with a subframe set, (e.g., S1).

DTA may be as described herein such as in the examples or may be the negative of that described or may be that described multiplied by a certain factor.

A delta which may be calculated or otherwise determined by the WTRU may be a function of one or more power control components of different subframe sets, such as a function of (e.g., the sum of), the differences of multiple power control components of different subframe sets. For example, the delta may be a function of, such as the sum of, the difference between TPC command accumulators and the difference between pathloss terms for different subframe sets where the different subframe sets may include the subframe set corresponding to the current subframe and a subframe set that does not correspond to the current subframe. This delta may be referred to as a delta of PC parameters and may be referred to as D-PCP. D-PCP may be applicable on a per transmission type or channel basis. There may be multiple D-PCP, such as one for the difference between TPC command accumulators (DTA) and another for the difference between the pathloss terms. In one or more embodiments described throughout this disclosure, DTA may be replaced by one or more D-PCP.

For example, in subframe i, which may be a subframe in which a PHR may be transmitted by the WTRU, if one UL subframe set, e.g., S1, may be the reference subset, one or more D-PCP values may be determined such as by the WTRU for another UL subframe set (e.g., S2). A serving cell c PUSCH D-PCP value for the other UL subframe set may be represented by D-PCP_PUSCH,cS2(i), and may be computed for the case of a D-PCP corresponding to the sum of the pathloss deltas and the sum of the TPC command accumulator deltas, as follows:

$$D\text{-PCP\_PUSCH}_{cS2}(i) = [\alpha_{cS2}(j) - \alpha_{cS1}(j)] \times PLc + [f_{cS2}(i) - f_{cS1}(i)]. \quad \text{Equation (11)}$$

A delta which may be calculated or otherwise determined by the WTRU may be the difference between the PH of different subframe sets. For example the delta in a given subframe may be the difference between the PH values determined using the PC parameters corresponding to two different UL subframe sets such as a reference UL subframe set and a set that is not the reference UL subframe set or corresponding to the UL subframe set to which the current subframe belongs and to a UL subframe set to which the current subframe does not belong. This delta may be referred to as a deltaPH.

There may be a Type 1 deltaPH for PUSCH only transmission and a Type 2 deltaPH for PUCCH transmission which may be combined with PUSCH transmission. For example, in subframe i, which may be a subframe in which a PHR may be transmitted by the WTRU, if one UL subframe set, (e.g., S1), may be the reference UL subframe set or the UL subframe set to which the current subframe belongs, one or more deltaPH values may be determined such as by the WTRU for another UL subframe set (e.g., S2).

As an example, a serving cell c Type 1 deltaPH value for the UL subframe set S2 may be the difference between the Type 1 PH determined using one or more parameters for S2 and the Type 1 PH determined using one or more parameters for S2.

As another example, a serving cell c (e.g., PCell) Type 2 deltaPH value for the UL subframe set S2 may be the difference between the Type 2 PH determined using one or more parameters for S2, and the Type 2 PH determined using one or more parameters for S2.

In one or more embodiments described herein, DTA and/or D-PCP may be replaced by deltaPH.

A WTRU may calculate or otherwise determine PH in a current subframe for a UL subframe set to which the current subframe does not belong. The WTRU may do this by using one or more power control components, such as the TPC command accumulator values, which correspond to the other UL subframe set. For example, if the current subframe belongs to a UL subframe set, (e.g., S1) and does not belong to another UL subframe set, (e.g., S2), a Type 1 PH for UL subframe set S2 may be calculated by substituting S2 power control components for S1 power control components in the PH equations. As an example, Equation (4) may be transformed as follows:

$$PH_{type1c,S2}(i) = P_{CMAX,c}(i) - \{10 \log_{10}(M_{PUSCH,c}(i) + P_{O\_PUSCH,c}(j) + \alpha_c(j) \cdot PL_c + \Delta_{TF,c}(i) + f_{cS2}(i)\}. \quad \text{Equation (12)}$$

Subframe set specific PO and pathloss factor values may be included, and the PH for subframes sets S1 and S2 may be computed as follows:

$$PH_{type1,cS1}(i) = P_{CMAX,c}(i) - \{10 \log_{10}(M_{PUSCH,c}(i) + P_{O\_PUSCH,cS1}(j) + \alpha_{cS1}(j) \cdot PL_c + \Delta_{TF,c}(i) + f_{cS1}(i)\}, \quad \text{Equation (13)}$$

and $$PH_{type1,cS2}(i) = P_{CMAX,c}(i) - \{10 \log_{10}(M_{PUSCH,c}(i) + P_{O\_PUSCH,cS2}(j) + \alpha_{cS2}(j) \cdot PL_c + \Delta_{TF,c}(i) + f_{cS2}(i)\}. \quad \text{Equation (14)}$$

For each activated serving cell, the WTRU may do one or more of the following:

1) The UW may calculate a Type 1 PH for the UL subframe set to which the current subframe belongs. Calculation of the OH may use the power control parameters for the subframe subset to which the current subframe belongs or the subframe subset to which the current subset belongs for PUSCH transmission.

2) The WTRU may calculate a Type 1 PH for one or more UL subframe sets to which the current subframe may not belong. The calculation of the PH may be limited to serving cells for which there may be PUSCH transmission in the current subframe. The calculation of the PH may be limited to UL subframe sets which may be identified, for example by signaling from the eNB, as subframe sets for which to calculate and send PH when the current subframe may not belong to that UL subframe set. The Pcmax,c value the WTRU may use in the PH calculation may be the Pcmax,c value for the current subframe (e.g., MPR values for the current subframe may be used) for UL subframe set S1 (e.g., Pemax,c for S1 may be used). There may be one Pcmax,c for a subframe independent of the subframe set or sets to which the subframe may belong, or the Pcmax,c for the subframe set, e.g., S1, to which the current subframe may belong may be used, (e.g., Pcmax,c for S1 may be used). The Pcmax,c value the WTRU may use in the PH calculation may be the Pcmax,c value for the current subframe (e.g., MPR values for the current subframe may be used) for the UL subframe set for which the PH is being calculated (e.g., if the PH is being calculated for subframe set S2, Pcmax,c for subframe set S2 may be used which may mean Pemax,c for S2 may be used). The Pcmax,c value may be a special Pcmax,c value for which the allowed power reductions may be set to zero which may result in the Pcmax,c value being equal to Pemax,c. The Pemax,c value corresponding to the subframe set to which the current subframe belongs, e.g., S1, may be used. The Pemax,c value corresponding to a specific subframe set, e.g., S1, may be used. The Pemax,c value corresponding to the UL subframe set for which the PH is being calculated (e.g., S2) may be used.

3) The WTRU may calculate a Type 2 PH (if the serving cell is the PCell) for one or more UL subframe sets to which the current subframe may not belong. The calculation of the PH may be limited to PHR transmission subframes in which there may be a PUCCH transmission. The calculation of the PH may be limited to UL subframe sets which may be identified, for example by signaling from the eNB, as subframe sets for which to calculate and send PH when the current subframe may not belong to that UL subframe set. The Pcmax,c value the WTRU may use in the PH calculation may be in accordance with one of the options described for PUSCH above.

The WTRU may include one or more of the following in a PHR, for example, for each activated serving cell. The Type 1 PH for the UL subframe set to which the current subframe may belong. The Type 2 PH for the UL subframe set to which the current subframe may belong where inclusion may be limited to PCell and/or when the WTRU may be configured for simultaneous PUSCH and PUCCH. The Type 1 PH for one or more UL subframe sets to which the current subframe may not belong. The Type 2 PH for one or more UL subframe sets to which the current subframe may not belong where inclusion may be limited to PCell and/or when the WTRU may be configured for simultaneous PUSCH and PUCCH. Type 1 PH for a reference UL subframe set. Type 1 PH for one or more UL subframe sets which are not the reference UL subframe set. Type 2 PH for the UL subframe set which is the reference UL subframe set where inclusion may be limited to PCell and/or when the WTRU may be configured for simultaneous PUSCH and PUCCH. Type 2 PH for one or more UL subframe sets which are not the reference UL subframe set where inclusion may be limited to PCell and/or when the WTRU may be configured for simultaneous PUSCH and PUCCH.

Pcmax,c values for the current subframe as appropriate based on which channels may be transmitted in the current subframe where the Pcmax,c values may be configured by the WTRU based on the UL subframe set to which the current subframe may belong. Pcmax,c values for one or more subframe sets to which the current subframe may not belong. Inclusion of the values may be based on which channels may be transmitted in the current subframe. Inclusion of the values may be based on whether the Pcmax,c values which are based on the UL subframe set to which the current subframe may belong are included, e.g., if an S1 Pcmax,c may be included, then the corresponding S2 Pcmax,c may be included. These Pcmax,c values may not be needed since the difference between S1 Pcmax,c and S2 Pcmax,c may be the Pemax,e values which the eNB may know.

One or more DTA or D-PCP values may be used including a DTA or D-PCP value with respect to the UL subframe set to which the current subframe belongs or with respect to a reference subframe set. A DTA or D-PCP value for each of one or more channels for each of one or more UL subframe sets to which the current subframe may not belong or a DTA or D-PCP value for each of one or more channels for each of one or more UL subframes sets which is not the reference UL subframe set. A DTA or D-PCP value may only be included if it meets the criteria for being calculated such as criteria described earlier herein. A DTA or D-PCP value for a channel may not be included if the channel may not be transmitted in the current subframe; alternatively, the DTA value may be included regardless of whether the channel may be transmitted in the current subframe. DTA or D-PCP values may be capped at a maximum value and/or a minimum value. The value included in the PHR which may represent a DTA or D-PCP value may be the calculated value (which may or may not be capped) or another value which may represent the value or a range of values in which the actual value may be found. If a DTA or D-PCP value is not channel specific, the value may be included once for the UL subframe set and not for each channel.

Type 1 deltaPH for each of one or more UL subframe sets to which the current subframe may not belong or for each of one or more UL subframe sets which is not the reference UL subframe set, the value included in the PHR which may represent a deltaPH value may be the calculated value (which may or may not be capped) or another value which may represent the value or a range of values in which the actual value may be found. Type2 deltaPH for each of one or more UL subframe sets to which the current subframe may not belong or for each of one or more UL subframe sets which is not the reference UL subframe set, inclusion may be limited to PCell and when the WTRU may be configured for simultaneous PUSCH and PUCCH, the value included in the PHR which may represent a deltaPH value may be the calculated value (which may or may not be capped) or another value which may represent the value or a range of values in which the actual value may be found.

An indication of the magnitude of a delta (e.g., DTA, D-PCP, deltaPH) from a value corresponding to the reference subframe set or the UL subframe set to which the current subframe belongs. As an example, a flag or bit may be included which may indicate a delta (e.g., DTA, D-PCP, deltaPH) for another UL subframe set is less than and greater than a threshold (e.g., 3 dB). The indication may be included for Type 1 deltaPH and Type 2 deltaPH (e.g., for the PCell). One bit may be used.

In one example, the WTRU may include in a PHR for activated serving cell c, Type1 PH for certain or all subframe sets, possibly in the order of S1, S2, . . . , regardless of the subframe set to which the subframe of the PHR transmission may belong. The WTRU may include in a PHR for the PCell, Type2 PH for certain or all subframe sets, possibly in the order of S1, S2, . . . , regardless of the subframe set to which the subframe of the PHR transmission may belong. By using a reference and a fixed order, there may be less chance of misinterpretation between the WTRU and the eNB as to which is the subframe set associated with each entry in the PHR.

In another example, the WTRU may include a PHR for activated serving cell c, Type1 PH for a reference UL subframe set and one or more of PUSCH DTA or D-PCP or Type 1 deltaPH for each additional subframe set which may be configured. Additional or other criteria may be needed for inclusion of DTA and D-PCP and Type 1 deltaPH. The WTRU may include in a PHR for the PCell, Type2 PH for a reference UL subframe set and one or more of PUCCH DTA or D-PCP or Type 2 deltaPH for each additional subframe set which may be configured. Additional or other criteria may be needed for inclusion of DTA and D-PCP and deltaPH.

Additional criteria may be needed for inclusion in the PHR by the WTRU of the PH and one or more of the delta values for one or more UL subframe sets besides the reference subframe set or besides the subframe set to which the current subframe belongs.

Such criteria may include one or more of: explicit enablement of PHR inclusion by the eNB (e.g., signaling a flag or parameter); configuration and activation or other type of enablement of subframe sets in general; and configuration and activation or other type of enablement of specific subframe sets, e.g., inclusion for a UL subframe set may be based on at least whether that subframe set has been configured and activated or otherwise enabled. Since use of subframe sets may apply on a serving cell basis, determination by the WTRU of whether certain or any criteria for inclusion is met, and inclusion in the PHR by the WTRU of the PH and one or more of the delta values for one or more UL subframe sets in addition to the reference subframe set or in addition to the subframe set to which the current subframe belongs, may be made by the WTRU per serving cell or per activated serving cell.

A WTRU ordinarily expects CRS in at least part of all DL and special subframes and may use any of these subframes for measurements such as RSRP, RSRQ, and radio link monitoring (RLM). To allow for the possibility that there may be interference from neighbors, a measurement subframe pattern (e.g., MeasSubframePatternPcell) may be provided by the eNB to the WTRU for the PCell to restrict the subframes that the WTRU uses on the PCell for these measurements and operations. Since pathloss is a function of RSRP, the determination of pathloss for the PCell may be restricted in this manner. Some issues may arise for the case of dynamic switching of subframe directions for TDD. One is that the dynamic switching may be on an Scell, not a PCell. A measurement subframe pattern may be needed for the SCell and this pattern may be used by the WTRU to know which subframes to use for RSRP and the corresponding pathloss. Another issue may be that the existing subframe pattern which may be used to combat neighbor cell interference in the absence subframe direction switching may not be sufficient.

A subframe pattern to be used by a WTRU for RSRP and pathloss measurements may be determined by the WTRU by one or more of the following: explicit signaling by the eNB for each serving cell or for each serving cell which may be used as a pathloss reference; as a function of the UL subframe sets to be used for PC and PH, and as a function of the SIB1 and other TDD UL/DL configuration(s) provided to the WTRU. For example, the WTRU may use the subframes which are DL in the SIB1 TDD UL/DL configuration. The WTRU may use the subframes which are fixed as DL in a WTRU specific TDD UL/DL configuration.

As an example, the WTRU may use the subframes as designated by an explicit (e.g., explicitly signaled by the eNB) pattern, such as MeasSubframePattern or a similar pattern, which may be further restricted by one or more of the following: the subframes in the explicit pattern which are DL in a given frame; the subframes in the explicit pattern which are DL in the SIB1 TDD UL/DL configuration; and the subframes in the explicit pattern which are fixed as DL in a WTRU specific TDD UL/DL configuration.

One or more patterns may be indicated (e.g., signaled) by the eNB to the WTRU and determined and used by the WTRU for each serving cell or for each serving cell to be used as a pathloss reference. Subframe patterns may be different for different serving cells. In a given frame, based on a subframe pattern for a serving cell the WTRU may include one or more of those DL subframes for RSRP measurements and pathloss determination for that serving cell.

A WTRU may be required to make multiple, e.g., 2, 3, or more, RSRP measurements and pathloss calculations for certain serving cells such as those which may be used as a pathloss reference and which may have subframes with directions that may change, for example dynamically. For certain serving cells such as those which may be used as a pathloss reference, each UL subframe set may be assigned a pathloss calculation which may be based on a certain subframe pattern.

One of the triggers for PH reporting is a large change in pathloss. A PHR may be triggered if prohibitPHR-Timer expires or has expired and the path loss has changed more than dl-PathlossChange dB for at least one activated Serving Cell which is used as a pathloss reference since the last transmission of a PHR when the WTRU has UL resources for new transmission. Since the pathloss factor may be different for different UL subframe sets, there may be different pathloss change thresholds for the different UL subframe sets. In addition, due to interference being different in different subframes, there may be a different pathloss calculated for each UL subframe set. The pathloss trigger may be modified to account for one or more of a separate pathloss change threshold per UL subframe set and a separate pathloss calculation for each UL subframe set.

As an example, let dl-PathlossChange(S) be the DL pathloss change threshold for UL subframe set S (e.g., S=S1 or S2), then the pathloss trigger may become:

A PHR may be triggered if prohibitPHR-Timer expires or has expired and the path loss has changed more than dl-PathlossChange(S) dB for at least one UL subframe set for at least one activated Serving Cell which is used as a pathloss reference since the last transmission of a PHR when the WTRU has UL resources for new transmission. If dl-PathlossChange(S) is the same for the different subframe sets, dl-PathlossChange may be used.

In one example, the WTRU may be operating without UL subframe sets and the eNB may configure the WTRU with a second UL subframe set or with parameters for a second UL subframe set. It may be useful for the eNB to know quickly what the current power headroom is. A PHR may be triggered by the WTRU when a UL subframe set or one or more parameters for a UL subframe set is configured and reconfigured, for example by signaling such as RRC signaling received from the eNB.

If the difference in the values of power, PH, or certain PC components (e.g., DTA, D-PCP, deltaPH) between UL subframe sets or UL PC component sets exceeds a threshold, the WTRU may trigger a PHR. Inclusion of one or more values in the PHR contents may be predicated on whether this threshold has been exceeded. For example one or more delta values may be included if the threshold is exceeded. As another example, PH for multiple subframe sets or PC component sets may be included in the PHR if the threshold is exceeded. One or more of these values may not be included if the threshold is not exceeded.

For each subframe set, the WTRU may maintain one or more of the following separately: Prohibit timer; Periodic Timer; and Pathloss change threshold.

An eNB may want to control the output power of different subframe sets for example to mitigate interference differently for those sets. A way for this control to occur is to provide UL subframe set specific power control parameters. The parameters for which the eNB may provide and the WTRU may use separately for different UL subframe sets may include the eNB controlled maximum output power per for serving cell c, Pemax,c. For example, the WTRU may receive and use for serving cell c, Pemax,cS1 and Pemax,cS2 for the case of 2 subframe sets. The parameters may include PO_NOMINAL_PUCCH and/or PO_WTRU_PUCCH and PO_NOMINAL_PUSCH,c(j) and/or PO_WTRU_PUSCH,c(j), where the value of j may correspond to a transmission type. For example, for PUSCH (re)transmissions corresponding to a semi-persistent grant, j may be 0, for PUSCH (re)transmissions corresponding to a dynamic scheduled grant j may be 1 and for PUSCH (re)transmissions corresponding to a random access response grant j may be 2. Pathloss factor (such as mentioned earlier) may be designated as ac(j).

A WTRU may receive and apply UL subframe set specific power control parameters to open loop power control. For example, this may be applied to initial RACH preamble transmission power:

PREAMBLE_RECEIVED_TARGET_POWER: A WTRU may receive a different parameter value for different UL subframe set. A WTRU may receive one value via SIB2, as indicated for legacy WTRUs. A WTRU may receive a separate and different value, to be used for preamble transmission for a UL subframe set, possibly in SIB2, as an extension, and possibly included in common physical layer DCI indicating the dynamic UL/DL configuration.

A WTRU may receive and apply an additional offset to preamble transmission power determination. The WTRU may apply the offset to the preamble transmission power, and may be applied for transmission in certain UL subframe set, (e.g., the second UL subframe set).

WTRU may receive and apply measured UL subframe and subframe set specific interference measurements to preamble transmission power determination. The interference measurement may be the value last reported by the WTRU to the eNB. This may be in addition to or instead of the pathloss calculation applied for WTRUs.

A WTRU may receive UL subframe set specific value for power step for preamble retransmission power determination along with the normal power step value indicated in SIB2. For example, a WTRU may apply the normal power step value to preamble retransmission power if retransmission occurs in UL subframe belonging to the UL subframe set 1, and may apply the UL subframe specific power step value for retransmission if the retransmission occurs in a UL subframe belonging to UL subframe set 2. A WTRU may apply the two separate power step parameter values in the same preamble transmission/re-transmission procedure sequence.

A WTRU may apply the UL subframe specific power control parameters for RACH preamble transmissions while in RRC_connected mode, for example, for the purpose of timing alignment or SR procedure. For preamble retransmissions, a WTRU may not apply UL subframe specific power control parameters if the selected UL subframe for preamble retransmission is in a different UL subframe set than the UL subframe for the previous initial or retransmission of the preamble. A WTRU may apply UL subframe specific parameters for PDCCH ordered, (e.g., DCI 1A), or dedicated, handover, RACH procedures. In these cases, a WTRU may receive UL subframe set specific parameters in the dedicated RACH command, for PDCCH ordered in DCI and for handover in an RRC message, and possibly the subframe set to which the parameters apply. A WTRU may apply the UL subframe specific parameter for transmission of PRACH preamble if the subframe resource selected for random access is included in the applicable UL subframe set.

Different WTRU power control-related procedures may depend on different sets of power control components which may be applicable to different subframes or sets of subframes. These procedures may be impacted by a change to the sets of subframes or a change to the subframes in one or more sets. Solutions for handling these changes are described herein. A WTRU may maintain separate UL power control component sets which may include open-loop and closed-loop power control components. A power control component set may be associated with certain subframes such as a set of subframes, e.g., set of UL subframes. The WTRU may modify and change the subframes included in each set or associated with a power control component set based on the reception of configuration or indication of changes to the association or to the sets, for example via signaling from an eNB.

Changes to sets of subframes or the association between power control components and subframes may occur at the beginning of a radio frame or any other time.

A WTRU may not modify the power control components and parameters, (e.g., TPC command accumulator, PO_PUCCH and PO_PUSCH, and the like), of a set of UL subframes as a result of a change and modification of the subframes in that set. For example, if the WTRU may maintain two sets of UL subframes, (e.g., S1, which may be a high-interference set, and S2 which may be a low-interference set), the WTRU may modify the UL subframes in at least one set in response to an eNB request. The WTRU may not change the value of the TPC command accumulator and any one or more such as all other UL power control components corresponding to S1 and S2 as a result of the change of UL subframes of that set.

The WTRU may reset the TPC command accumulator, possibility to zero, of a set of UL subframes as a result of the change and modification of the subframes in that set.

Between the time instant that a WTRU may receive a TPC command and the time instant that the WTRU may transmit the corresponding UL subframe of that TPC (e.g., the UL subframe in which the TPC is to be applied), the sets of the UL subframes of the WTRU may change. In this case, the WTRU may process this TPC according to one or a combination of the following: the WTRU may discard the TPC command and may not use it for any TPC command accumulation; the WTRU may apply, e.g., add, the TPC command to the TPC command accumulation according to the new subframe sets or new linkage between subframes and PC component sets; and the WTRU may apply, e.g., add, the TPC command to the TPC command accumulation according to the old subframe sets or linkage between subframes and PC component sets, e.g., according to the subframe sets or linkage between subframes and PC component sets at the time of reception of the TPC command.

In a solution, if semi-persistent scheduling (SPS) is activated for a WTRU, and an SPS transmission is scheduled for a specific UL subframe which may be reconfigured to downlink subframe dynamically, the SPS cycle may be kept and one or more of following WTRU behavior may be used: a WTRU may not transmit SPS in that subframe with dropping the SPS packet and continue SPS transmission in next SPS cycle; a WTRU may not transmit SPS in that subframe with buffering the SPS packet and resume SPS transmission from the SPS packet buffered dWTRU to the subframe reconfiguration; and a WTRU may not transmit SPS in that subframe and may autonomously deactivate the SPS transmission.

In a solution, if a SPS is activated for a WTRU and a SPS transmission is scheduled for a specific UL subframe which may be reconfigured to downlink subframe dynamically, the SPS transmission for that subframe may be delayed to a UL subframe before the next SPS cycle. One or more of the following may apply.

As for the UL subframe, the next UL subframe may be used for delayed SPS transmission. For the SPS UL resource determination, at least one of following may apply: the same SPS resource assigned at the SPS activation may be used in the next UL subframe if there is no (E)PDCCH with CRC scrambled with SPS C-RNTI in that subframe. The WTRU may decode (E)PDCCH with CRC scrambled with SPS C-RNTI in that subframe, and the WTRU may not use the SPS resource assigned in SPS activation in that subframe even though the WTRU may not receive (E)PDCCH with CRC scrambled with SPS C-RNTI.

As for the UL subframe, predefined subframe offset may be used for delayed SPS transmission. For instance, if the subframe n is changed from UL to downlink and a UL SPS transmission is scheduled for the subframe n, a WTRU may transmit SPS transmission in the UL subframe n+Koffset, where Koffset may be a subframe offset which may be configured via higher layer or predefined positive integer number. For the SPS UL resource determination, at least one of the following may apply: the same SPS resource assigned at the SPS activation may be used in the UL subframe n+Koffset if there is no (E)PDCCH with CRC scrambled with SPS C-RNTI in that subframe; and the WTRU may decode (E)PDCCH with CRC scrambled with SPS C-RNTI in that subframe and the WTRU may not use the SPS resource assigned in SPS activation in that subframe even though the WTRU may not receive (E)PDCCH with CRC scrambled with SPS C-RNTI.

As for the UL subframe, one of the UL subframes within a time window may be selected dynamically. For instance, if the subframe n is changed from UL to downlink and a UL SPS transmission is scheduled for the subframe n, the WTRU may monitor (E)PDCCH with CRC scrambled with SPS C-RNTI within the time window Kwindow. Therefore, a WTRU may monitor (E)PDCCH with CRC scrambled with SPS C-RNTI from subframe n+1 to subframe n+Kwindow+1 where the Kwindow denotes window size in TTI level. The Kwindow should be smaller than the SPS cycle. The Kwindow may be predefined as a fixed positive integer number. The Kwindow may be defined as a function of SPS cycle. The Kwindow may be configured via higher layer or informed via broadcasting channel.

UL subframe sets may change by configuring or otherwise indicating (e.g., dynamically) which subframes are in which UL subframe sets. Whether or not a subframe is UL or DL at a certain time such as in a certain frame may be configured or otherwise determined separately from which subframes are in which UL subframe set(s). A WTRU may maintain PC components or parameters for a certain UL subframe set and continue to use those for that certain UL subframe set regardless of whether the subframes in that UL subframe set change. The WTRU may use those PC components or parameters for PC and PH calculations. For a given UL subframe i, the WTRU may determine which subframe set that subframe belongs to and then use the PC components and parameters for that subframe set to determine the transmit power for that subframe. If PHR is to be transmitted in that subframe, the WTRU may use the PC components and parameters for that subframe set to determine one or more PH values and may also use PC components and parameters for one or more other subframe sets to determine one or more other PH or delta values if PH or delta values for other subframe sets, for example if they may be transmitted as well. If there are separate subframe sets for different transmission types, the above applies separately for each transmission type. When the subframes in a UL subframe set are changed (e.g., via signaling from the eNB), the Po and other PC components or parameters for the power control for PUSCH and PUCCH for the subframe set may also be (or may be required to be) changed (e.g., via signaling from the eNB).

If the WTRU receives a new parameter such as a new Po for a certain UL subframe set, the WTRU may reset the TPC command accumulator(s) associated with that UL subframe set. As a result, the WTRU power calculations may change, and so may the WTRU headroom calculations.

One or a combination of the following mechanisms may be used to improve the interference measurement and/or reporting for FDD and/or TDD systems. These include spatial characteristics of measured/reported interference, measurements entity of received interference, sub-frame dependent interference measurement/reporting, WTRU interference measurement during UL transmission, source of the interference, and/or improvement of UL interface indication (HII and OI).

As part of interference measurement and reporting, a WTRU may measure and/or report to an eNB, the eNB that it is connected to, the following characteristics of the received interference along with other characteristics including the direction that the WTRU may receive the dominant interference component, such as the WTRU may report the worst PMI, beam, etc., and the location of the WTRU itself.

As part of interference measurement and/or reporting, an eNB may collect (for example from WTRUs), measure and/or report to other eNBs and/or other network entities characteristics of the received interference including the direction of the received dominant interference component, as measured by the eNB itself or reported to the eNB by a WTRU and the location of the measured interference, including the location of the eNB itself and/or the location of the WTRU which may have measured and/or reported the received interference, and other characteristics.

As a part of interference reporting and signaling, an eNB may inform other eNBs and/or other network entities whether the signaled/reported interference components are measured at the eNB or at its associated WTRUs.

As a part of interference measurement and/or reporting from a WTRU to an eNB and/or from an eNB to other eNB(s), the reporting entity (which may be the WTRU or eNB) may also include an indication of the time instance that the interference has been received. For example, such time indication may include the system frame number that the interference has been measured and/or the subframe number that the interference has been measured. As an example, the WTRU and/or eNB may report the interference level for every DL and/or UL subframe of a radio frame.

A WTRU may measure and/or report its received interference in a UL subframe. In such a UL subframe, the WTRU may also transmit in UL direction. A WTRU may stop UL transmission, to be able to measure its received interference, by measuring interference in a set of SRS resources, by not transmitting any SRS in the SRS resources that it may use for measurement, and by receiving an indication about the set of SRS that it may perform a measurement. This set of SRS may be different from the set of SRS resources that the WTRU may transmit SRS. The WTRU may measure interference in some or all configured SRS resources of some specific subframes. The WTRU may receive an indication of the subframes where it may measure interference in some or all SRS resources. The WTRU may not transmit SRS in some or all SRS resources of some specific subframes. The WTRU may receive an indication of the subframes where it may not transmit SRS in some or all SRS resources. A WTRU may not transmit in some UL recourses, so it can measure the interference. As an example, the WTRU may puncture (and send no signal) in one OFDM symbol of the PRB to measure the interference in those punctured resources. As another example, the WTRU may only puncture every other resource element of an OFDM symbol in UL transmission.

As part of interference measurement and reporting, a WTRU may measure, indicate and/or report to an eNB, the eNB that it is connected to, whether the interference and/or the main component of the interference is generated by UL transmissions (possibility by other WTRUs) or DL transmissions (possibly by other eNBs). As part of interference measurement and reporting, an eNB may collect (for example from WTRUs), measure, indicate and/or report to other eNBs and/or other network entities, whether the interference and/or the main component of the interference is generated by UL transmissions (possibility by other WTRUs) or DL transmissions (possibly by other eNBs).

If an eNB and/or WTRU measure the interference in some physical resources, e.g., resource elements (REs) and/or resource blocks (RBs), of a DL subframe where other eNBs do not transmit any DL signal, then it may declare and/or indicate that the measured interference is mainly generated by UL transmission and/or other WTRUs. As an example, such interference may be measured in zero-power CSI-RS resources (and possibly the corresponding IMR resources) and/or when all or some eNBs share at least one zero-power CSI-RS configuration. If an eNB and/or WTRU measure the interference in some physical resources, e.g., resource elements (REs) and/or resource blocks (RBs), of a UL subframe, where other WTRUs do not transmit any UL signal, then it may declare and/or indicate that the measured interference is mainly generated by DL transmission and/or other eNBs. As an example, such interference may be measured in SRS resources that no WTRU is configured to use and/or when all cells share at least one such configuration.

In addition to the information that is already part of defined for relative narrowband transmit power (RNTP), high interference indicator (HIT) and overload indicator (OI), one or any combination of any other interference characteristics, which are discussed in this document, may be also provided as a part of HII and OI indicators.

Information may be transferred between eNBs for the purpose of interference coordination and mitigation to minimize eNB-to-eNB and WTRU-to-WTRU interference.

In one example, the information may include a UL/DL configuration or set of UL/DL configurations that is currently being used or may be used for DL HARQ timing reference for dynamic TDD reconfiguration of the cell.

In another example, the information may include a UL/DL configuration or set of UL/DL configurations that is currently being used or may be used for UL grant/PUSCH transmission timing and UL HARQ timing reference for dynamic TDD reconfiguration of the cell.

In another example, the information may include a UL/DL configuration or set of UL/DL configurations that is provided by the eNB to WTRU by PDCCH DCI for dynamic TDD reconfiguration of the cell.

One or more UL subframe sets may be provided. For example, the HII or OI value provided in an existing X2 message may be provided with subframe level information by indicating the UL subframe set that has high interference, (e.g., "flexible" UL subframes), and the UL/DL direction of the subframes.

An eNB may provide a separate set of per-PRB-based RNTP, OI, or HII values for each UL/DL configuration or subframe set provided in the transferred message.

Figure 11:
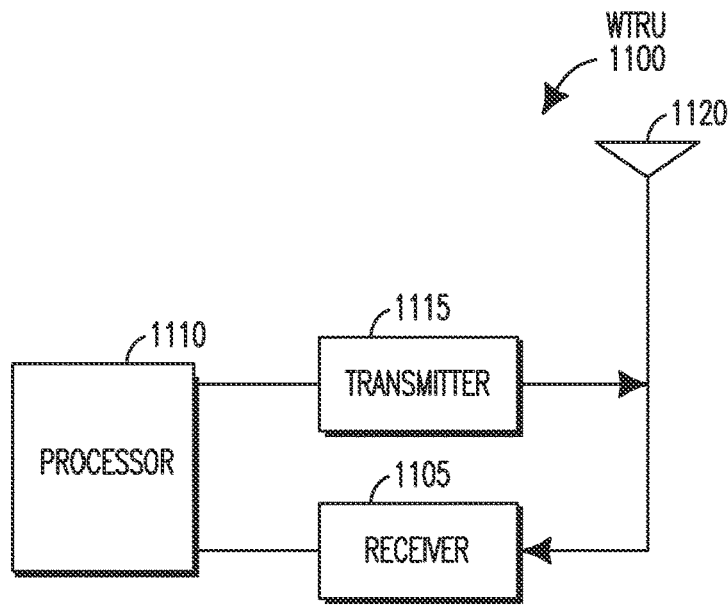
FIG. 11 is an example block diagram of a WTRU.

FIG. 11 is an example block diagram of a WTRU 1100 including a receiver 1105, a processor 1110, a transmitter 1115 and at least one antenna 1120. The receiver 1105 may be configured to receive a configuration of UL subframe sets. The processor 1110 may be configured to maintain a plurality of TPC command accumulator values that correspond to respective ones of the UL subframe sets. The processor 1110 may be further configured to determine, for a subframe of a UL transmission, a particular one of the UL subframe subsets that the UL transmission subframe belongs to, and select one of the TPC command accumulator values that corresponds to the particular UL subframe subset to determine power of the UL transmission when transmitting in the UL transmission subframe.

Still referring to FIG. 11, the receiver 1105 may be further configured to receive a TPC command via a DL transmission, and the processor 1110 may be further configured to adjust the value of the TPC command accumulator corresponding to the received TPC command. The receiver 1105 may be further configured to receive the TPC command in a subframe n of the DL transmission. The TPC command accumulator corresponding to the TPC command may correspond to UL transmission subframe n+k, and subframe n+k may belong to the particular UL subframe set, where n is an integer, and k is an integer greater than zero. The receiver 1110 may be further configured to receive a UL grant in DL subframe n for UL resources in UL subframe n+k. The value of k may be determined from a UL grant timing for a TDD UL/DL configuration used as a reference for the UL grant timing.

The transmitter 1115 may be configured to transmit a PH report including a PH value associated with the particular UL subframe set. The processor 1110 may be further configured to apply different received TPC commands to different TPC command accumulator values, and to use a plurality of power control components associated with the particular UL subframe subset to determine a PH value for the UL transmission subframe.

As shown in FIG. 11, the receiver 1105 may be configured to receive a configuration of UL subframe subsets and a TPC command in a subframe n of a DL transmission. The UL subframe sets may belong to a TDD frame. The processor 1105 may be configured to determine a subframe n+k of a UL transmission that the received TPC command corresponds to, determine which of the UL subframe subsets the UL transmission subframe n+k belongs to, and adjust a TPC command accumulator value that corresponds to the determined UL subframe set to determine power of the UL transmission when transmitting in the UL transmission subframe, where n is an integer, and k is an integer greater than zero.

Figure 12:
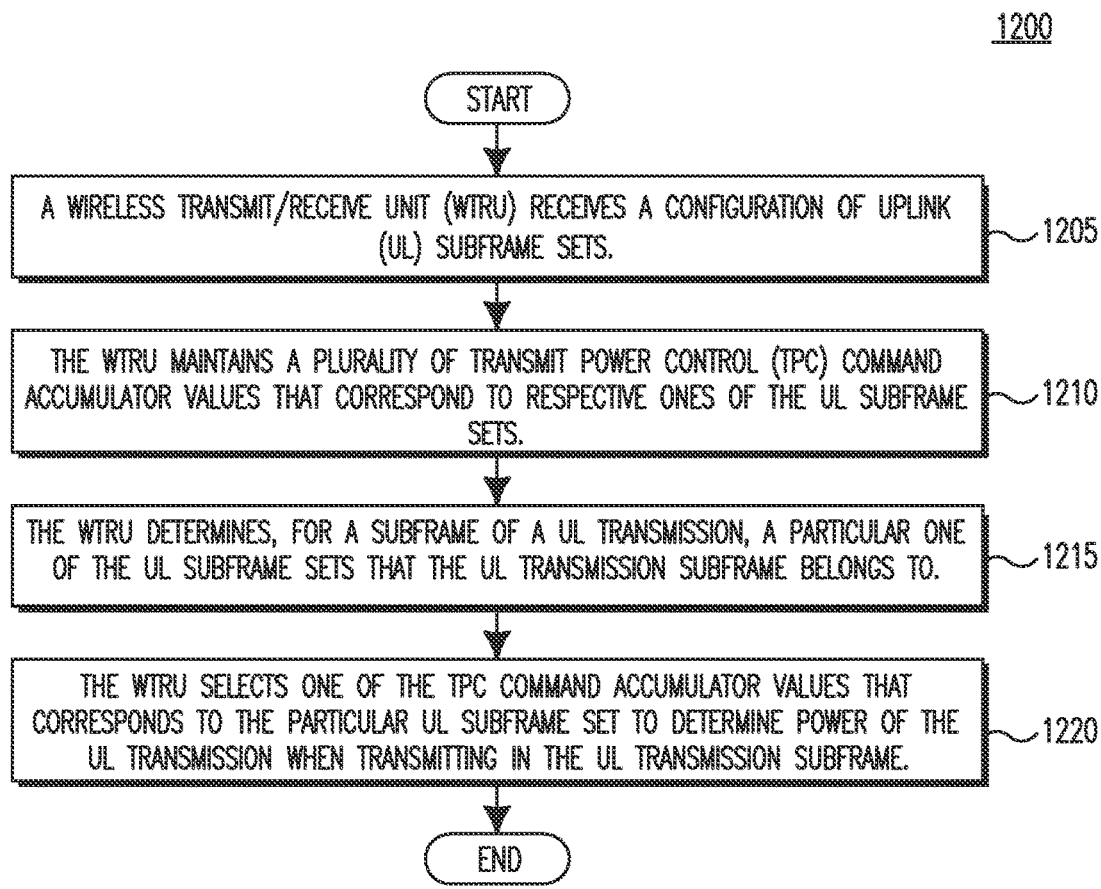
FIGS. 12 and 13 are flow diagrams of transmit power control (TPC) procedures that may be implemented by the WTRU of FIG. 11.

FIG. 12 is a flow diagram of a TPC procedure 1200 that may be implemented by the WTRU 1100 shown in FIG. 11. As shown in FIG. 12, a WTRU may receive a configuration of UL subframe sets (1205). The WTRU may maintain a plurality of TPC command accumulator values that correspond to respective ones of the UL subframe sets (1210). The WTRU may determine, for a subframe of a UL transmission, a particular one of the UL subframe sets that the UL transmission subframe belongs to (1215). The WTRU may select one of the TPC command accumulator values that corresponds to the particular UL subframe set to determine power of the UL transmission when transmitting in the UL transmission subframe (1220).

Figure 13:
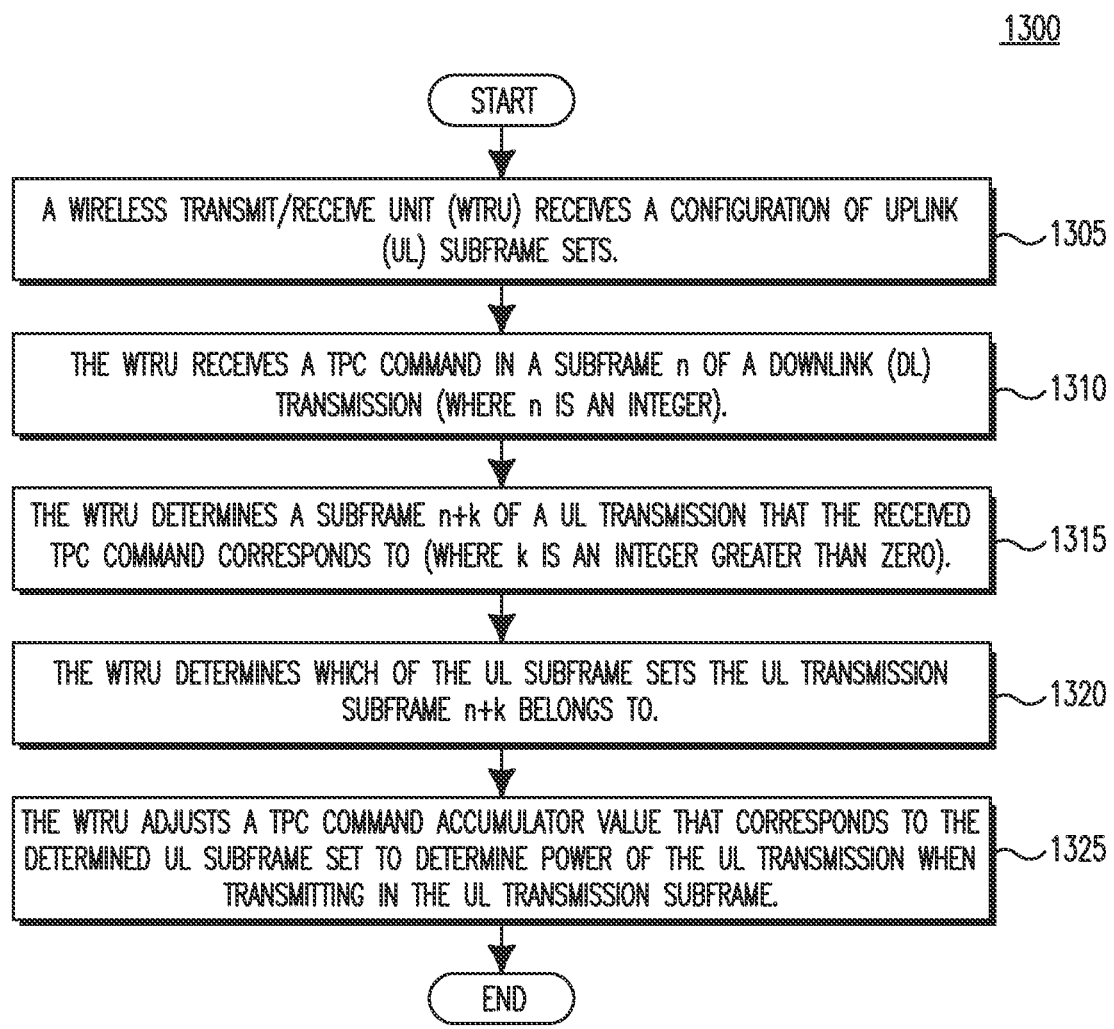

FIG. 13 is a flow diagram of a TPC procedure 1300 that may be implemented by the WTRU 1200 shown in FIG. 11. A WTRU may receive a configuration of UL subframe sets (1305). The WTRU may receive a TPC command in a subframe n of a DL transmission (where n is an integer), (1310). The WTRU may determine a subframe n+k of a UL transmission that the received TPC command corresponds to (where k is an integer greater than zero), (1315). The WTRU may determine which of the UL subframe sets the UL transmission subframe n+k belongs to (1320). The WTRU may adjust a TPC command accumulator value that corresponds to the determined UL subframe set to determine power of the UL transmission when transmitting in the UL transmission subframe (1325).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method, implemented in a wireless transmit/receive unit (WTRU), the method comprising:
the WTRU receiving an indication of a time/frequency resource in at least one subframe for performing an interference measurement;
the WTRU performing the interference measurement of the indicated time/frequency resource, according to the indication, wherein the interference measurement is performed in at least one of a sounding reference signal (SRS) resource in an uplink subframe and a zero-power channel state information reference signal (CSI-RS) resource in a downlink subframe;
the WTRU determining whether a main component of interference measured during the interference measurement is generated by an uplink (UL) transmission or a downlink (DL) transmission based on whether the interference is measured in at least one of the SRS resource in the uplink subframe and the CSI-RS resource in the downlink subframe; and
the WTRU sending a report based on the performed interference measurement, wherein the report includes an identification of a subframe number or a system frame number indicating a time instance during which the interference measurement was performed and an indication of whether the main component of the interference measured during the interference measurement was generated by the UL transmission or the DL transmission.

2. The method of claim 1, wherein the WTRU performs the measurement on a set of resource elements (REs).

3. The method of claim 1, wherein the WTRU performs the measurement and sends the report in an uplink (UL) subframe.

4. A wireless transmit/receive unit (WTRU) comprising:
a receiver configured to receive an indication of a time/frequency resource in at least one subframe for performing an interference measurement;
a processor configured to:
perform the interference measurement of the indicated time/frequency resource, according to the indication, wherein the interference measurement is performed in at least one of a sounding reference signal (SRS) resource in an uplink subframe and a zero-power channel state information reference signal (CSI-RS) resource in a downlink subframe, and
determine whether a main component of interference measured during the interference measurement is generated by an uplink (UL) transmission or a downlink (DL) transmission based on whether the interference is measured in at least one of the SRS resource in the uplink subframe and the CSI-RS resource in the downlink subframe; and
a transmitter configured to send a report based on the performed interference measurement, wherein the report includes an identification of a subframe number or a system frame number indicating a time instance during which the interference measurement was performed and an indication of whether the main component of the interference measured during the interference measurement was generated by the (UL) transmission or the DL transmission.

5. The WTRU of claim 4, further comprising an antenna coupled to the receiver and the transmitter.

6. The WTRU of claim 4, wherein the processor is further configured to perform the measurement on a set of resource elements (REs).

7. The WTRU of claim 4, wherein the processor is configured to perform the measurement, and the transmitter is configured to send the report, in an uplink (UL) subframe.

8. The WTRU of claim 4, wherein the transmitter is configured to not transmit in UL resources in which the processor is configured to perform the measurement.

* * * * *